United States Patent
Conrad

(10) Patent No.: US 8,021,526 B2
(45) Date of Patent: Sep. 20, 2011

(54) HOUSEHOLD APPLIANCES WHICH UTILIZE AN ELECTROLYZER AND ELECTROLYZER THAT MAY BE USED THEREIN

(75) Inventor: Wayne Ernest Conrad, Hampton (CA)

(73) Assignee: G.B.D. Corp, Nassau (BS)

( * ) Notice: Subject to any disclaimer, the term of this patent is extended or adjusted under 35 U.S.C. 154(b) by 893 days.

(21) Appl. No.: 11/577,904

(22) PCT Filed: Apr. 4, 2006

(86) PCT No.: PCT/CA2006/000506
§ 371 (c)(1),
(2), (4) Date: Apr. 25, 2007

(87) PCT Pub. No.: WO2006/105648
PCT Pub. Date: Oct. 12, 2006

(65) Prior Publication Data
US 2009/0038937 A1    Feb. 12, 2009

Related U.S. Application Data

(60) Provisional application No. 60/668,170, filed on Apr. 5, 2005, provisional application No. 60/780,822, filed on Mar. 10, 2006.

(51) Int. Cl.
    C25B 11/02    (2006.01)
    C25B 1/06     (2006.01)
    C25B 1/08     (2006.01)
(52) U.S. Cl. ......... 204/268; 204/270; 205/616; 205/628
(58) Field of Classification Search .............. 205/616
    See application file for complete search history.

(56) References Cited

U.S. PATENT DOCUMENTS 3,652,431 A * 3/1972 Reynolds .............. 205/338
(Continued)

OTHER PUBLICATIONS

Rousar et al, "Calculation of bypass currents in molten salt bipolar cells", Journal of Applied Electrochemistry, vol. 24, Apr. 1994, pp. 1124-1132.*

(Continued)

Primary Examiner — Harry D Wilkins, III
(74) Attorney, Agent, or Firm — Philip C. Mendes da Costa; Bereskin & Parr LLP/S.E.N.C.R.L.,s.r.l.

(57) ABSTRACT

A household appliance incorporating an electrolyzer for electrolysis of water to $H_2$ and $O_2$ and an electrolyzer therefor. The appliance may include a burner for the hydrogen produced and an electric conductive member to provide household current to the electrolyzer. The electrolyzer comprises an outer housing defining a chamber which houses at least one cathode and at least one anode. The electrolyzer may comprise a plurality of field electrodes and the field electrodes may comprise first and second field electrodes which are electrically connected together and spaced apart to define an intra cell gap. Field electrodes may then be spaced apart to define an inter cell gap between electrodes of adjacent field electrodes. At least one of the anode and cathode may be connected to an electrically conductive member that is molded in situ in the housing and at least some of the electrodes may be configured to dimensionally stabilize the electrodes during operation of the electrolyzer. The number of field electrodes may be from 40 to 60 if a voltage of 120 V is supplied to the electrolyzer, 80 to 120 if the voltage is 240 V, or 4 to 6 if the voltage is 12 V. The gap between adjacent electrodes may vary between top and bottom and the electrolyzer may incorporate a plastic heat sink.

23 Claims, 15 Drawing Sheets

U.S. PATENT DOCUMENTS

| | | | | |
|---|---|---|---|---|
| 4,184,931 | A * | 1/1980 | Inoue | 205/341 |
| 4,332,219 | A * | 6/1982 | Gonzalez | 123/3 |
| 4,337,126 | A * | 6/1982 | Gilligan et al. | 205/349 |
| 4,655,941 | A | 4/1987 | Suzuki | |
| 4,824,534 | A * | 4/1989 | Tetzlaff et al. | 205/334 |
| 4,926,837 | A | 5/1990 | Parker et al. | |
| 5,616,234 | A | 4/1997 | Rhees et al. | |
| 5,628,885 | A * | 5/1997 | Lin | 204/230.5 |
| 5,720,867 | A * | 2/1998 | Anastasijevic et al. | 205/98 |
| 6,222,163 | B1 | 4/2001 | Arntz et al. | |
| 6,224,720 | B1 * | 5/2001 | Anastasijevic et al. | 204/268 |
| 6,395,154 | B1 * | 5/2002 | Stuart et al. | 204/253 |
| 6,474,330 | B1 * | 11/2002 | Fleming et al. | 126/512 |
| 6,589,404 | B1 * | 7/2003 | Anastasijevic et al. | 204/237 |
| 6,689,259 | B1 | 2/2004 | Klein | |
| 6,827,827 | B2 * | 12/2004 | Nakamoto et al. | 204/230.2 |
| 6,866,756 | B2 | 3/2005 | Klein | |
| 6,877,503 | B1 | 4/2005 | Hibshman, II et al. | |
| 2002/0077579 | A1 | 6/2002 | Tobe | |
| 2002/0108866 | A1 * | 8/2002 | Bonilla Griz | 205/637 |
| 2003/0006144 | A1 | 1/2003 | Tremblay et al. | |
| 2003/0146108 | A1 | 8/2003 | Nakamura et al. | |
| 2004/0065542 | A1 | 4/2004 | Fairfull et al. | |
| 2004/0072717 | A1 | 4/2004 | Cordellina et al. | |
| 2005/0269210 | A1 | 12/2005 | Klein | |

OTHER PUBLICATIONS

NREL National Renewal Technology Brief: Analysis of Current-Day Commercial Electrolyzers, National Renewable Energy Laboratory, Sep. 2004, NREL/MP-560-36734, Mldwest Research Institute, Colorado, USA.

Yeh, T., The Optimum Concentration of Electrolytes for an Electrode Humidifier, Mar. 25, 1999, published by the Oklahoma Junior Academy of Science at http://oas.ucok.edu/OJAS/99/papers/yeh.htm. (Claim 1 to 18).

Kaz®, Inc. Vicks® Vaporizer Owner's Manual, Dated 2000 by Kaz, Incorporated, Hudson NY. Publication date of the on-line document established by Internet Archive Wayback Machine, http://web.archive.org/web/20030629162243/kaz.com/html/PDFs/V150_2000_manual.pdf, made public Jun. 29, 2003.

Parish, Alton, E-107 Hydrogen Generation for Fuel Cells, Business Communications Compnay, Inc., Publishes Dec. 2003, pp. 1-37, http://www.becresearch.com/energy/E107.htm.

Ivy, Johanna, Summary of Electrolytic Hydrogen Production, Milestone Completion Report, National Renewable Energy Laboratory, pp. 1-29, Sep. 2004, NREL/MP-560-36734, Midwest Research Institute, Colorado, USA, http://www.nrel.gov/publications.

Office Action on U.S. Appl. No. 11/741,219, mailed Oct. 4, 2010.

* cited by examiner

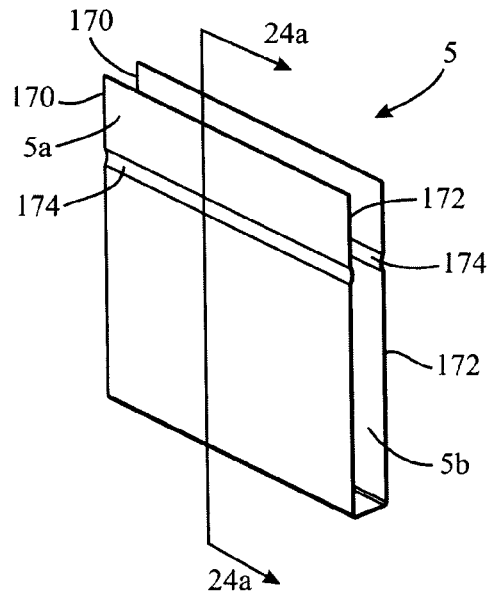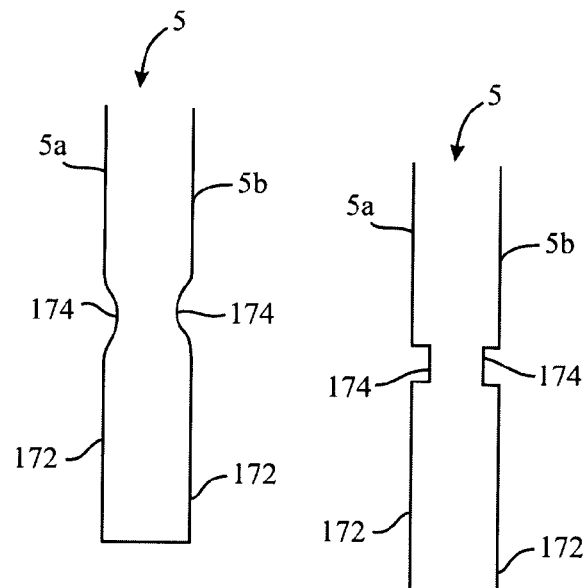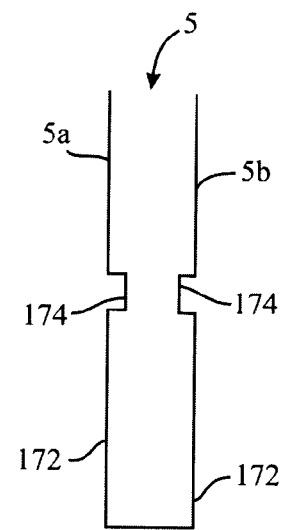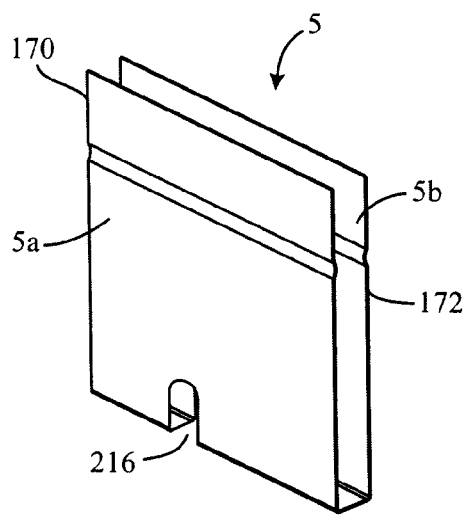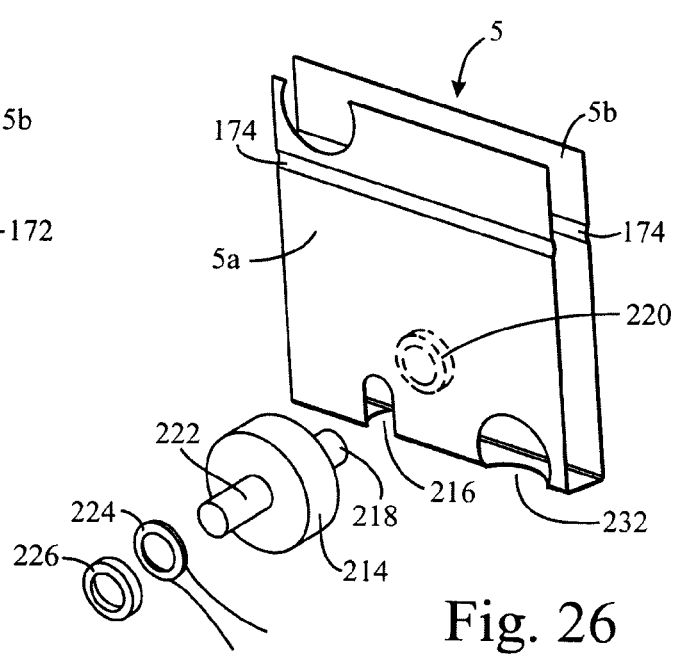

HOUSEHOLD APPLIANCES WHICH UTILIZE AN ELECTROLYZER AND ELECTROLYZER THAT MAY BE USED THEREIN

FIELD OF THE INVENTION

This invention relates to a household apparatus, including a cooking appliance such as a barbeque, which utilizes an electrolyzer to produce a combustible gas that is utilized in the household appliance. This invention also relates to a method and apparatus for producing a gas, preferably hydrogen and/or oxygen, by the electrolysis of an electrolyte solution, and preferably an aqueous electrolyte solution, and means of employing the method and apparatus.

BACKGROUND OF THE INVENTION

Electrolytic cells require the input of electricity. The electricity is converted to a combustible gas. Various electrolytic cells are known in the art. Typically, electrolyzers operate at high current. For example, an electrolyzer that operates at about 300 watts may require 3-5 volts at 60 amps. A disadvantage of known electrolysis cells is limited efficiency of the electrolytic cells, namely the amount of electricity that must be input compared to the energy value of the combustible gas that is produced. The limited efficiency of known electrolytic cells has limited the use of electrolytic cells to produce a clean burning fuel. In addition, the use of high current to operate electrolyzers creates safety issues, particularly in domestic (i.e., residential) applications.

SUMMARY OF THE INVENTION

In accordance with one aspect of the present invention, there are provided various different embodiments of electrolyzers. The features set out in these embodiments may be used individually or a plurality of the features may be used in a single electrolyzer.

In accordance with another aspect of the present invention, there are provided various apparatus that employ an electrolyzer. These apparatus may be used with known electrolyzers. Preferably, they are used with an electrolyzer as disclosed herein.

In accordance with another aspect of the present invention, there are provided a method and apparatus for housing an electrolyzer and operating the electrolytic cell to reduce the pressure differential that may be imposed on the outer housing of an electrolyzer during operation of the electrolyzer.

In accordance with one aspect of the instant invention, there is provided a method for a consumer to prepare a household appliance having an electrolyzer for use, the method comprising the consumer:
  (a) obtaining a household appliance including an electrolyzer; and,
  (b) preparing the electrolyte solution.

In one embodiment, the household appliance, when acquired by the consumer, incorporates therein an electrolyte precursor and the electrolyte solution is prepared by the consumer adding one or more additional ingredients to the household appliance.

In another embodiment, the consumer prepares the electrolyte solution in an external container and the method further comprises adding the prepared electrolyte solution to the household appliance.

In another embodiment, the household appliance is provided in packaging and the method further comprises including an electrolyte precursor in the packaging.

In another embodiment, the electrolyte precursor is contained in the household appliance.

In another embodiment, the electrolyte precursor is contained in the electrolyzer.

In another embodiment, the electrolyte solution is prepared from a non-caustic electrolyte precursor and the consumer prepares the electrolyte solution by acquiring an electrolyte precursor and mixing the electrolyte precursor with water.

In another embodiment, the electrolyte precursor is a dry powder or a concentrated solution.

In another embodiment, the electrolyte precursor comprises bicarbonate.

In another embodiment, the electrolyte solution is prepared by combining the electrolyte precursor and water.

In another embodiment, the electrolyte solution is prepared by combining the bicarbonate and water and operating the electrolyzer to produce hydroxide.

In another embodiment, the electrolyte solution is prepared by combining an electrolyte precursor and water to produce a first solution and passing a current through the solution to produce the electrolyte solution wherein the electrolyte solution is more caustic than the first solution.

In another embodiment, the electrolyte precursor is contained in a soluble container.

In accordance with another aspect of the instant invention, there is provided a method of shipping a household appliance having an electrolyzer comprising:
  (a) inserting the household appliance in packaging wherein the electrolyzer does not incorporate therein an electrolyte solution;
  (b) providing with the household appliance instructions for preparing the electrolyte solution.

In one embodiment, the method further comprises inserting in the packaging an electrolyte precursor.

In another embodiment, the method further comprises providing the electrolyte precursor in the household appliance.

In another embodiment, the method further comprises providing the electrolyte precursor in the electrolyzer.

In another embodiment, the household appliance includes a liquid reservoir for the electrolyzer and the method further comprises providing the electrolyte precursor in the reservoir.

In accordance with another aspect of the instant invention, there is provided an electrolyzer comprising:
  (a) an outer housing defining a chamber and comprising at least one liquid inlet port and at least one gas outlet port;
  (b) wherein the chamber houses at least one cathode, at least one anode and a plurality of field electrodes positioned between the anode and the cathode;
  (c) wherein the field electrodes comprise first and second electrodes which are electrically connected together and spaced apart to define an intra cell gap between the first and second electrodes of the same field electrode;
  (d) wherein the field electrodes are spaced apart to define an inter cell gap between electrodes of adjacent field electrodes; and,
  (e) at least one flow channel in fluid communication with the first and second gaps.

In one embodiment, the anode and the cathode are each connected to a power source.

In another embodiment, the electrolyzer further comprises retaining members positioned to receive the field electrodes.

In another embodiment, the retaining members comprise slots provided in the chamber.

In another embodiment, the retaining members removably receive the field electrodes.

In another embodiment, one of the electrodes of a first field electrode is connected to a power source to define the anode, one of the electrodes of a second field electrode that is spaced from the first field electrode is connected to the power source to define the cathode and at least one field electrode is positioned between the first and second field electrodes.

In another embodiment, the inter cell gap is from 0.005 and 2 inches.

In another embodiment, the inter cell gap is from 0.005 and 0.25 inches.

In another embodiment, the inter cell gap is from 0.005 and 0.1 inches.

In another embodiment, the inter cell gap is from 0.01 and 0.06 inches.

In another embodiment, the intra cell gap is from 0.05 and 2 inches.

In another embodiment, the intra cell gap is from 0.075 and 0.75 inches.

In another embodiment, the intra cell gap is from 0.125 and 0.5 inches.

In another embodiment, the flow channel is from 0.125 and 0.25 inches tall.

In another embodiment, each of the inter cell and intra cell gaps has a top and a bottom and at least one of the gaps is wider at the top then the bottom.

In another embodiment, each of the inter cell and intra cell gaps has a top and a bottom and at least one of the gaps is narrower at the top then the bottom.

In another embodiment, each of the first and second electrodes has a height of 3 inches or less.

In another embodiment, each of the first and second electrodes has a height of 0.5 to 4 inches and a width of 0.5 to 4 inches.

In another embodiment, each of the first and second electrodes has a height that is about twice to four times the width.

In another embodiment, each of the first and second electrodes has a height of 2 inches of less.

In another embodiment, each of the field electrodes is generally U shaped.

In another embodiment, each of the field electrodes is formed by bending a generally planer member into a generally U shape.

In another embodiment, the first and second electrodes of each field electrode are connected together by a member that is integrally formed with the first and second electrodes.

In another embodiment, the electrolyzer uses an electolyte solution comprising an aqueous solution of bicarbonate, hydroxide, or mixtures thereof.

In another embodiment, the electrolyzer uses an electolyte solution comprising an aqueous solution of hydroxide.

In another embodiment, the concentration of the electrolyte in the electrolyte solution is 1% to 30% by weight based on the total weight of the electrolyte solution.

In another embodiment, the concentration of the electrolyte in the electrolyte solution is 0.25% to 10% by weight based on the total weight of the electrolyte solution.

In another embodiment, the concentration of the electrolyte in the electrolyte solution is 0.75% to 5% by weight based on the total weight of the electrolyte solution.

In another embodiment, the outer housing is plastic.

In another embodiment, the outer housing has a heat sink provided thereon.

In another embodiment, the heat sink is plastic and is integrally formed as part of the housing.

In another embodiment, the electrolyzer further comprises a first electrically conductive member to which the anode is connected and a second electrically conductive member to which the cathode is connected, wherein each electrically conductive member is molded in situ with the housing.

In another embodiment, the anode and cathode are configured to be in electrical contact with the respective electrically conductive member when inserted into the chamber.

In another embodiment, the anode and cathode have an opening formed therein which seats on the respective electrically conductive member when inserted into the chamber.

In another embodiment, the electrolyzer is operable on household current.

In another embodiment, the electrolyzer has from 40 to 60 field electrodes and operates on 120V.

In another embodiment, the electrolyzer has from 80 to 120 field electrodes and operates on 240V.

In another embodiment, the electrolyzer has from 4 to 6 field electrodes and operates on 12V.

In another embodiment, the electrolyzer is provided in a household appliance.

In another embodiment, the household appliance is a cooking appliance

In another embodiment, the household appliance is portable and includes a power cord that is removably receivable in a household electrical outlet.

In another embodiment, the electrolyzer is connected to a power source via a bridge rectifier.

In another embodiment, the electrolyzer is powered by a power source that provides one of constant voltage, constant current and constant power.

In another embodiment, the field electrodes are configured to dimensionally stabilize the first and second electrodes during operation of the electrolyzer.

In another embodiment, the first and second electrodes each have at least one transversely extending rib.

In another embodiment, the transversely extending ribs are integrally formed in the electrodes.

In another embodiment, the first and second electrodes are planar and the transversely extending ribs merge with the electrodes at a joint that is rounded.

In another embodiment, at least some of the field electrodes have openings therethrough.

In another embodiment, at least one of the field electrodes is constructed from woven cloth or woven screen.

In accordance with another aspect of the instant invention, there is provided an electrolyzer comprising an outer plastic housing defining a chamber and comprising at least one liquid inlet port and at least one gas outlet port, wherein the chamber houses at least one cathode and at least one anode and at least one of the anode and the cathode is connected to an electrically conductive member that is molded in situ with the housing.

In one embodiment, the electrolyzer further comprises a plurality of field electrodes positioned between the anode and the cathode.

In another embodiment, the electrolyzer further comprises a first electrically conductive member to which the anode is connected and a second electrically conductive member to which the cathode is connected, wherein each electrically conductive member is molded in situ with the housing.

In another embodiment, at least one of the anode and the cathode is configured to be in electrical contact with the electrically conductive member when inserted into the chamber.

In another embodiment, the anode and cathode are configured to be in electrical contact with the respective electrically conductive member when inserted into the chamber.

In another embodiment, the anode and cathode have an opening formed therein which seats on the respective electrically conductive member when inserted into the chamber.

An electrolyzer comprising an outer housing defining a chamber and comprising at least one liquid inlet port and at least one gas outlet port, wherein the chamber houses at least one cathode, at least one anode and a plurality of field electrodes positioned between the anode and the cathode and each electrode is spaced apart to define a gap between adjacent electrodes, wherein at least some of the electrodes are configured to dimensionally stabilize the electrodes during operation of the electrolyzer.

In one embodiment, the electrodes are mounted in the chamber by a member provided on opposed sides of the electrodes and at least some of the electrodes have at least one rib extending transversely between the opposed sides.

In another embodiment, the transversely extending ribs are integrally formed in the electrodes.

In another embodiment, the first and second electrodes are planar and the transversely extending ribs merge with the electrodes at a joint that is rounded.

In another embodiment, the gap is less than 0.1 inches.

In another embodiment, the electrodes have a thickness of 0.001-0.1 inches.

In accordance with another aspect of the instant invention, there is provided an electrolyzer comprising an outer housing defining a chamber and comprising at least one liquid inlet port, at least one gas outlet port, at least one cathode, at least one anode and a plurality of field electrodes positioned between the anode and the cathode, wherein the field electrodes comprise first and second electrodes which are electrically connected together and wherein:
  (a) the number of field electrodes is from 40 to 60 if the voltage supplied to the electrolyzer is 120 v;
  (b) the number of field electrodes is from 80 to 120 if the voltage supplied to the electrolyzer is 240 v; and,
  (c) the number of field electrodes is from 4 to 6 if the voltage supplied to the electrolyzer is 12 v.

In one embodiment, the first and second electrodes of a filed electrode are spaced apart to define an intra cell gap between the first and second electrodes of the same field electrode and the field electrodes are spaced apart to define an inter cell gap between electrodes of adjacent field electrodes and the intra cell gap is from 0.005 and 2 inches.

In another embodiment, the intra cell gap is from 0.005 and 0.25 inches.

In another embodiment, the intra cell gap is from 0.005 and 0.1 inches.

In another embodiment, the intra cell gap is from 0.01 and 0.06 inches.

In another embodiment, the inter cell gap is from 0.05 and 2 inches.

In another embodiment, the inter cell gap is from 0.075 and 0.75 inches.

In another embodiment, the inter cell gap is from 0.125 and 0.5 inches.

In another embodiment, the electrolyzer further comprises a flow channel connecting the gaps in fluid flow communication wherein the flow channel is from 0.125 and 0.25 tall inches.

In another embodiment, each of the inter cell and intra cell gaps has a top and a bottom and at least one of the gaps is wider at the top then the bottom.

In another embodiment, each of the inter cell and intra cell gaps has a top and a bottom and at least one of the gaps is narrower at the top then the bottom.

In another embodiment, each of the first and second electrodes has a height of 3 inches or less.

In another embodiment, each of the first and second electrodes has a height of 0.5 to 4 inches and a width of 0.5 to 4 inches.

In another embodiment, each of the first and second electrodes has a height that is about twice to four times the width.

In another embodiment, each of the first and second electrodes has a height of 2 inches of less.

In another embodiment, each of the field electrodes is generally U shaped.

In another embodiment, each of the field electrodes is formed by bending a generally planer member into a generally U shape.

In another embodiment, the first and second electrodes of each field electrode are connected together by a member that in integrally formed with the first and second electrodes.

In another embodiment, the electrolyzer is provided in a household appliance.

In another embodiment, the household appliance is a cooking appliance

In another embodiment, the household appliance is portable and includes a power cord that is removably receivable in a household electrical outlet.

In accordance with another aspect of the instant invention, there is provided an electrolyzer comprising an outer housing defining a chamber and comprising at least one liquid inlet port, at least one gas outlet port, at least one cathode, at least one anode and a plurality of field electrodes positioned between the anode and the cathode, wherein the field electrodes comprise first and second electrodes which are electrically connected together wherein at least one of the field electrodes has a plurality of openings that have a diameter of 0.0005-0.5 inches.

In one embodiment, at least one of the field electrodes is constructed from a woven material.

In another embodiment, the electrolyzer is provided in a household appliance.

In another embodiment, the household appliance is a cooking appliance

In another embodiment, the household appliance is portable and includes a power cord that is removably receivable in a household electrical outlet.

In accordance with another aspect of the instant invention, there is provided an appliance comprising:
  (a) an electrolyzer having an electrolyte solution;
  (b) a heat exchanger in thermal communication with the electrolyte solution;
  (c) a temperature sensor in thermal communication with the electrolyte solution; and,
  (d) a burner for gas produced by the electrolyzer
  whereby the heat exchanger is operated to maintain the electrolyte solution in a predetermined temperature range.

In one embodiment, the appliance is designed for use outdoors and the predetermined temperature range is from above freezing point of the electrolyte solution to below the boiling point of the electrolyte solution.

In another embodiment, the appliance is a fireplace or a cooking appliance.

In another embodiment, the predetermined temperature range is from 70-170° F.

In another embodiment, the predetermined temperature range is from 120-160° F.

In another embodiment, the electrolyzer is operated at a pressure from 1 to 60 psi above atmospheric pressure.

In another embodiment, the electrolyzer is operated at a pressure from 2 to 25 psi above atmospheric pressure.

In another embodiment, the electrolyzer is operated at a pressure from 2 to 15 psi above atmospheric pressure.

In another embodiment, the heat exchanger is in fluid flow communication with the electrolyzer.

In another embodiment, the appliance further comprises a flow loop comprising:
  (a) a passage extending between the heat exchanger and one or both of the electrolyzer and a liquid reservoir; and,
  (b) a pump in fluid communication with the flow loop whereby the pump circulates the electrolyte solution between the heat exchanger and the electrolyzer.

In accordance with another aspect of the instant invention, there is provided an electrolyzer comprising an outer housing defining a chamber and comprising at least one liquid inlet port and at least one gas outlet port, wherein the chamber houses a plurality of spaced apart electrodes comprising at least one cathode, at least one anode and a plurality of field electrodes positioned between the anode and the cathode wherein a gap having a top and a bottom is defined between adjacent electrodes and the gap between at least some adjacent electrodes varies between the top and bottom.

In one embodiment, at least one of the gaps is wider at the top then the bottom.

In another embodiment, at least one of the gaps is narrower at the top then the bottom.

In another embodiment, at least one of the gaps is V shaped.

In another embodiment, the V shaped gap has an internal included angle of 0.1° to 45°.

In another embodiment, the V shaped gap has an internal included angle of 2° to 20°.

In another embodiment, the V shaped gap has an internal included angle of 4° to 12°.

In accordance with another aspect of the instant invention, there is provided an electrolyzer comprising an outer housing defining a chamber and comprising at least one liquid inlet port and at least one gas outlet port, wherein the chamber houses a plurality of spaced apart electrodes wherein at least a portion of the outer housing is plastic and has a heat sink provided thereon.

In one embodiment, the heat sink is plastic and is integrally formed as part of the outer housing.

In another embodiment, all of the outer housing is plastic.

In another embodiment, the outer housing has first and second opposed end walls and first and second opposed side walls extending longitudinally between the end walls, the electrodes are oriented parallel to the end walls wherein the side walls are plastic and at least one of the end walls is metal.

In another embodiment, the end wall that is metal has heat dissipation members provided on the outer surface thereof.

In another embodiment, both of the end walls are metal.

In another embodiment, at least one of the end walls has heat dissipation members provided on the outer surface thereof.

In another embodiment, the electrodes comprise at least one cathode, at least one anode and a plurality of field electrodes positioned between the anode and the cathode.

In another embodiment, the electrolyzer is provided in a household appliance.

In another embodiment, the household appliance is a cooking appliance.

In another embodiment, the household appliance is portable and includes a power cord that is removably receivable in a household electrical outlet.

In accordance with another aspect of the instant invention, there is provided a household appliance comprising:
  (a) an electrolyzer having a plurality of electrodes and defining:
  (b) at least one oxygen producing cell and at least one oxygen outlet port in fluid flow communication therewith; and,
  (c) at least one hydrogen producing cell and at least one hydrogen outlet port in fluid flow communication therewith; and,
  (d) a burner in fluid flow communication with at least the hydrogen outlet port.

In one embodiment, the household appliance further comprises a plurality of oxygen producing cells and a plurality of hydrogen producing cells.

In another embodiment, the household appliance is a cooking appliance.

In another embodiment, the household appliance is portable and includes a power cord that is removably receivable in a household electrical outlet.

In another embodiment, the electrodes comprise at least one cathode, at least one anode and a plurality of field electrodes positioned between the anode and the cathode.

In another embodiment, the field electrodes comprise first and second electrodes which are electrically connected together and spaced apart to define an intra cell gap between the first and second electrodes of the same field electrode and wherein the field electrodes are spaced apart to define an inter cell gap between electrodes of adjacent field electrodes.

In another embodiment, each of the field electrodes is generally U shaped.

In another embodiment, each of the field electrodes is formed by bending a generally planer member into a generally U shape.

In another embodiment, the first and second electrodes of each field electrode are connected together by a member that in integrally formed with the first and second electrodes.

In accordance with another aspect of the instant invention, there is provided an appliance comprising:
  (a) an electrolyzer having an electrolyte solution;
  (b) a burner for gas produced by the electrolyzer; and,
  (c) an electric conductive member adapted to be connected to a household electrical power outlet, wherein the electric conductive member provides the electrolyzer with the same voltage that is supplied by the household electrical power outlet.

In another embodiment, the electric conductive member includes a plug adapted to be received in the household electrical power outlet.

In another embodiment, the household current is 120 v and the electric conductive member includes a plug adapted to be received in 120 v power outlet.

In another embodiment, the household current is 240 v and the electric conductive member includes a plug adapted to be received in 240 v power outlet.

In another embodiment, the electric conductive member comprises a circuit which does not incorporate a transformer.

In accordance with another aspect of the instant invention, there is provided an electrolyzer comprising:
  (a) an outer housing defining a chamber and comprising at least one liquid inlet port and at least one gas outlet port;
  (b) wherein the chamber houses at least one cathode, at least one anode and a plurality of field electrodes positioned between the anode and the cathode, wherein the field electrodes comprise first and second electrode surfaces;
  (c) wherein the field electrodes are spaced apart to define an inter cell gap between electrodes of adjacent field electrodes; and, (d) the concentration of the electrolyte in the electrolyte solution is 1% to 30% by weight based on the total weight of the electrolyte solution.

In one embodiment, the concentration of the electrolyte in the electrolyte solution is 0.25% to 10% by weight based on the total weight of the electrolyte solution.

In another embodiment, the concentration of the electrolyte in the electrolyte solution is 0.75% to 5% by weight based on the total weight of the electrolyte solution.

In another embodiment, the field electrodes comprise first and second electrodes which are electrically connected together and spaced apart to define an intra cell gap between the first and second electrodes of the same field electrode.

BRIEF DESCRIPTION OF THE DRAWINGS

These and other advantages of the instant invention will be more fully understood in conjunction with the following description of the preferred embodiments of the inventions wherein:

FIG. 24 is a perspective view of a generally U shaped pair of electrodes according to an embodiment of this invention;

FIG. 24a is a cross section along the line 24a-24a in FIG. 24;

FIG. 24b is a cross section along the line 24a-24a of an alternate embodiment of a generally U shaped pair of electrodes according to this invention;

FIG. 25 is a perspective view of a generally U shaped pair of electrodes according to an alternate embodiment of this invention; and, FIG. 26 is an exploded view of the electrical connection of the generally U shaped pair of electrodes of FIG. 25 to the housing shown in FIG. 21.

DETAILED DESCRIPTION OF THE PREFERRED EMBODIMENTS

In accordance with one aspect of the instant invention an electrolyzer is provided which comprises an outer housing defining a chamber and comprising at least one liquid inlet port and at least one gas outlet port and a plurality of electrodes positioned in the chamber. The plurality of electrodes positioned in the chamber comprise at least one cathode, at least one anode and at least one field electrode positioned between the anode and the cathode.

The outer housing may be of any particular size and configuration provided that it is capable of receiving therein a desired number of electrodes. It will be appreciated that, the outer housing must be constructed from a material that is chemically inert with respect to the electrolyte solution used in the electrolyzer. For example, the entirety of the outer housing may be constructed from a chemically inert material (e.g., polyethylene, polypropylene, ABS, acrylic or PVC (polyvinyl chloride), fiberglass, ceramic, porcelain or glass, and preferably plastic) or alternately, the portion of the outer housing that surrounds the chamber may be lined with a chemically inert layer (e.g., an insulation coated metal such as a glass lined tank). In one particularly preferred embodiment of this invention, the outer housing is constructed from plastic.

It will also be appreciated that the outer housing must be electrically insulating. By this, it is meant that a person will not receive an electrical current if the person touches the outer surface of the outer housing during the operation of the electrolyzer. Accordingly, the outer casing may be constructed from an electrically insulating material, e.g. plastic. Alternately, the outer casing may be of a multi wall construction separated by electrical insulating material.

Figure 1:
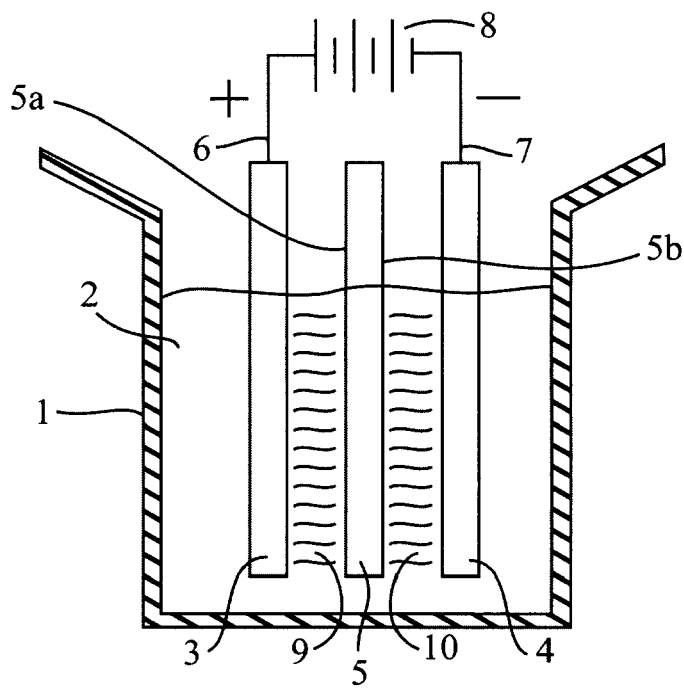
FIG. 1 is a section view of an electrolysis cell according to one embodiment of the invention.

FIG. 1 is a section view of an example of such an electrolyzer wherein a chemically inert electrically insulating container or outer housing 1 is partially filled with an electrolyte solution 2, in which the anode 3, the cathode 4, and the field electrode 5 are at least partially immersed. When power is applied to the anode and cathode such as by means of wires 6 and 7 respectively from a power source, such as battery 8, current flows through the circuit and ions in the electrolyte solution flow through gaps 9 and 10. The field electrode is not electrically connected to battery 8. Field electrode 5 is positioned between anode 3 and cathode 4 and is charged due to the current that flows through the electrolyte solution between anode 3 and cathode 4. Field electrode has two opposed surfaces, 5a and 5b, one of which serves as an anode and the other of which serves as a cathode. For example in FIG. 1, surface 5a functions as a cathode and surface 5b functions as an anode. Thus, the electrolyzer has 2 electrolysis cells. One electrolysis cell is defined by anode 3, gap 9 and surface 5a (which functions as a cathode). The second electrolysis cell is defined by surface 5b (which functions as an anode), gap 10 and cathode 4. Accordingly, due to the current flowing through electrolyte solution 2, surfaces 5*a* and 5*b*, which are electrically connected together, are induced to have opposite polarities and accordingly function as electrodes and define first and second electrodes of field electrode 5.

It has been determined that, if the electrolyte solution is aqueous, for a given production of hydrogen and oxygen, a higher voltage and lower current may be applied to this electrolyzer then with conventional electrolyzers. Essentially, half the current of a conventional electrolysis cell may be used to produce the same amount of hydrogen and oxygen. If the current is reduced by 50%, then the energy lost as heat in the wiring is reduced by about 75% as the heat losses are proportional to the square of the current. This allows much smaller gauge, lighter weight, less costly wiring to be employed. Accordingly, one advantage of this design is that the current supplied to the electrolyzer may be reduced and, in a particularly preferred embodiment, current supplied by a household outlet) is utilized. In a particularly preferred embodiment, the unit operates from a household electric supply without any transformer. Accordingly, an electrolyzer that requires 300 watts may be operated with 3 amps at about 100 v.

In one embodiment, the electrolyte solution may be any electrolyte solution known in the electrolysis art. Preferably, the electrolyte solution comprises an aqueous solution of bicarbonate, hydroxide, or mixtures thereof including, but not limited to, alkaline earth bicarbonates and/or hydroxides, (preferably one or more of sodium bicarbonate, potassium bicarbonate, sodium hydroxide and potassium hydroxide), or sulphuric acid, sodium chloride or acetic acid. More preferably, the electrolyte is an aqueous solution of bicarbonate, hydroxide, or mixtures thereof. Still more preferably, the electrolyte is an aqueous solution of one of sodium bicarbonate, potassium bicarbonate, sodium hydroxide and, most preferably, the electrolyte is an aqueous solution of one of sodium and/or potassium hydroxide.

The electrolyte solution may be a 0.1% to 30% by weight solution of the electrolyte (e.g., potassium hydroxide), more preferably 0.25% to 10% by weight, still more preferably 0.75% to 5% by weight, and most preferably 1.25% to 3.25% by weight based on the total weight of the electrolyte solution.

One advantage of this embodiment of the instant invention is that by using a low level of electrolyte, the fluid in the electrolyzer is substantially safer. In particular, if the electrolyzer is used in domestic applications, e.g., a household appliance such as to provide hydrogen for use in a fireplace, a cooking appliance (such as an indoor barbeque, a wok, a popcorn maker) or other appliances wherein a flame is required to provide heat, to do work or is otherwise useful (such as in a fireplace to provide a visible flame as an aesthetic feature), then the use of low levels of electrolyte (such as less than 10% by weight and preferably less than 5% by weight) will result in less or no damage to furniture, a kitchen counter, etc should the electrolyzer develop a leak.

In accordance with another embodiment of the instant invention, the electrolyzer is shipped without the electrolyzer containing the electrolyte solution. Preferably, the electrolyzer is shipped without any fluid therein. In accordance with this embodiment, the electrolyte or an electrolyte precursor is supplied separately or acquired separately by, e.g. a user. For example, in a particularly preferred embodiment, the electrolyzer is incorporated into a consumer or household appliance, and more preferably a portable consumer or household appliance. By portable, the applicant means an appliance that has a weight to permit an average person to be able to pick up and move the appliance. The appliance is purchased by the consumer, such as from a store. The packaging of the appliance may include a separate container containing the electrolyte solution that is premixed for use, the electrolyte or electrolyte precursor in a dry (e.g. powder) or concentrated form or instructions as to how to obtain the ingredients for the electrolyte solution and how to mix the electrolyte solution. Preferably, the packaging includes the electrolyte or electrolyte precursor in a dry form or instructions.

If the packaging includes a powdered electrolyte or electrolyte precursor, then the consumer may merely add the required amount of water to the electrolyte or electrolyte precursor to prepare a solution have a desired concentration. For example, the electrolyte or electrolyte precursor may be provided in the electrolyzer or a reservoir for the electrolyzer when the appliance is shipped. Thus, the solution may be prepared in the appliance itself. Alternately, a separate container, (e.g., a mixing bottle) may be provided with the packaging of the appliance. The electrolyte or electrolyte precursor may be in the mixing bottle. In such a case, the consumer need merely fill the container with a desired amount of water (e.g. to a fill mark), then mix the contents (e.g. shake the bottle to form a uniform solution) and then pour the solution in the, e.g., the reservoir and/or the electrolyzer. Alternately, the user may place the electrolyte in the electrolyzer and add water to form the electrolyzer fluid. Alternately, the consumer may purchase the electrolyte or electrolyte precursor, or a concentrated solution thereof, separately and then prepare the solution. In any such embodiment, the appliance may be shipped without any caustic material thereby simplifying the packaging and the transportation of the appliance. In particular, if the electrolyte is in a readily mixable dry form, then the packaging need not contain any liquid and there is no concern of the electrolyte solution freezing during transportation.

In a particularly preferred embodiment, the electrolyte that is used to prepare the electrolyte solution is a chemically neutral compound, such as a bicarbonate. By chemically neutral, the applicant means a compound that, when solubilized, does not form a solution that is harmful to human skin. For example, the appliance may be supplied with a powdered or tablet form of bicarbonate, such as sodium bicarbonate or potassium bicarbonate, and preferably potassium bicarbonate. Bicarbonate is considered a safe chemical and may easily be acquired by a consumer, such as by acquiring baking soda. The bicarbonate may be solubilized in a predetermined quantity of water to produce an electrolyte solution having the desired electrolyte concentration. When the electrolyzer is sealed, such as by screwing a cap on an inlet port, and activated, the passage of current through the solution will cause the potassium bicarbonate to react to produce potassium hydroxide and carbon dioxide will be evolved. Once the potassium hydroxide is formed, the appliance is then ready for use since continued use of the electrolyzer will result in the production of hydrogen gas and oxygen gas. Accordingly, the bicarbonate is an electrolyte precursor as it reacts to form the electrolyte. The appliance may come with instructions advising the consumer that after the bicarbonate solution is provided in the electrolyzer, to operate the appliance for a predetermined period of time after which the appliance will be ready for use. Accordingly, an advantage of this embodiment is that a product that requires a caustic material may be shipped, together with the caustic material in a benign form and the electrolyte solution used to produce hydrogen gas and oxygen gas may be formed in situ.

Preferably one or more of the anode, cathode, and/or field electrode or field electrodes is made of stainless steel, nickel, platinum, tungsten or other electrically conductive chemically inert material in the form of a solid member (e.g., a generally planar sheet) or an open material (e.g., expanded metal, a woven screen or a woven cloth). More preferably one or more of the anode, cathode, and/or field electrode or field electrodes is made from an open material. The open material has a porous structure, and preferably the openings have a diameter (or effective diameter if the openings are not completely circular) of from 0.0005 to 0.5 inches more preferably from 0.005-0.125 inches and most preferably from 0.02-0.05 inches. Such openings may be obtained by using a wire or the like having a diameter from 0.003-0.125 inches, preferably 0.005-0.05 inches and most preferably 0.008-0.015 inches wherein the material has 4 to 800 holes per inch, preferably 16 to 128 holes per inch and most preferably 32 to 64 holes per inch. It will be appreciated that a non-woven material having similar opening sizes may be used. In one embodiment, it is preferred that the open material has a liquid impermeable backing (e.g., it may be mounted on plastic, to prevent fluid flow between adjacent cells. One advantage of the use of an open material is that the fine porous structure of the material increases the surface area of the electrode thereby resulting in the production of more hydrogen and oxygen for a given volume of apparatus.

Preferably, the electrodes, and in particular the U shaped field electrodes, are constructed from a thin gauge material, thereby reducing the weight of the appliance and increasing the number of electrodes (and according cells) that may be provided in a given chamber. Preferably, the electrodes have a thickness of 0.001 to 0.1, more preferably 0.005 to 0.05 and most preferably 0.008 to 0.015 inches. It will be appreciated that, in alternate embodiments, and in particular those, which relate to the use of the electrolyzer, electrodes having a thickness known in the art, might be used.

If the electrodes are constructed from a thin gauge material, then it is preferred that the electrodes are dimensionally stabilized. For example, during operation, adjacent electrodes are oppositely polarized and the attractive force between adjacent electrodes may cause adjacent electrodes to bow towards each other. To prevent or reduce the bowing, the electrodes may be configured to provide dimensional stability. For example, the metal may be bent back or bent back upon itself to strengthen and stiffen the edges. The woven screen or woven cloth may also incorporate fiberglass or other rigidizing members to ensure that the electrodes do not deform during use. Alternately, as shown in FIGS. 24*a* and 24*b*, each of first electrode 5*a* and a second electrode 5*b* have spaced apart vertically extending sides and at least one transversely extending rib 174. Preferably, the transversely extending rib 174 is integrally formed in the electrode, such as by stamping a planar metal sheet to form an electrode having the desired configuration. The profile of rib 174 may be of any particular shape, such as square (see, e.g., FIG. 24*b*). Preferably, the first and second electrodes 5*a* and 5*b* are planar and the transversely extending ribs 174 merge with the electrodes 5*a* and 5*b* at a joint that is rounded (see, e.g., FIG. 24*a*).

It will be appreciated that a plurality of field electrodes 5 may be positioned between the anode and the cathode. If more than one field electrode is placed between the anode and the cathode, then the voltage may be further increased resulting in an increase in hydrogen and oxygen production per unit of charge flow. Thus, the electrolyzer incorporating more field electrodes can operate at a higher voltage and lower current than conventional electrolyzers to create the desired hydrogen and oxygen production rate.

Figure 2:
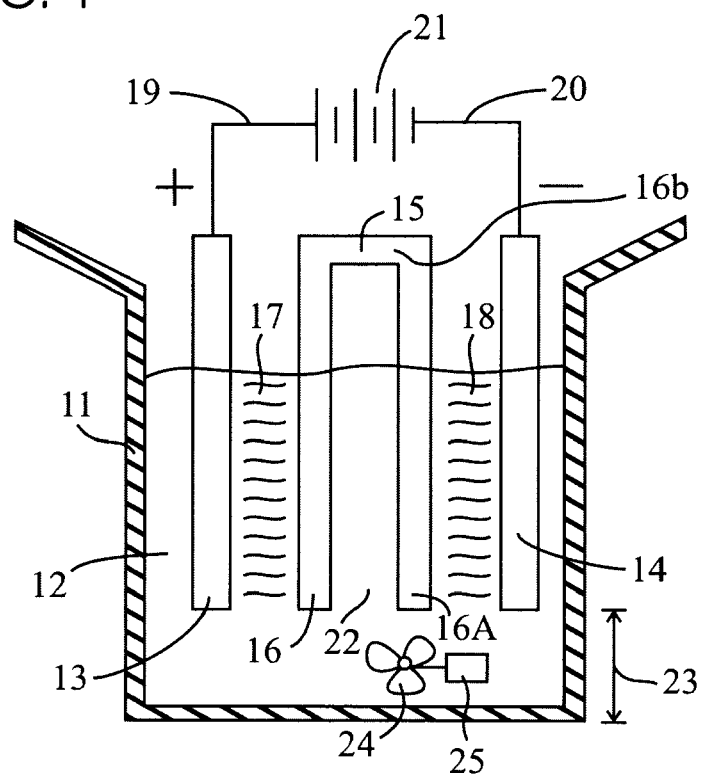
FIG. 2 is a section view of an alternate embodiment of the electrolysis cell.

FIG. 2 is a sectional view of an alternate aspect of this invention wherein the electrolyzer comprises a chemically inert electrically insulating container 11 is partially filled with an electrolyte solution 12, in which the anode 13, the cathode 14, and the field electrode 15 are at least partially immersed.

In accordance with this embodiment, at least one, and preferably each, field electrode 15 preferably comprises first and second electrodes 16, 16*a* which are electrically connected together by a member 16*b* and spaced apart to define a first or intra cell gap 22 between the first and second electrodes of the same field electrode and the field electrodes are spaced apart to define a second or inter cell gap 17, 18 between electrodes of adjacent field electrodes and between the first and second electrodes 16, 16*a* and the anode 13 and the cathode 14.

Electrodes 16, 16*a* may be electrically connected together by any means, such a wire extending between the two electrodes 16, 16*a*. Preferably, member 16*b* is an electrically conductive element that has about the same width as electrodes 16, 16*a*. In a particularly preferred embodiment, field electrode 15 is made of a thin material bent back upon itself so as to be generally U shaped with two electrodes 16 and 16*a*. Accordingly, member 16*b* may be integrally formed with electrodes 16, 16*a*. Therefore, field electrode 15 may be manufactured by stamping or other metal forming methods.

When potential is applied to the anode 13 and the cathode 14 by means of wires 19 and 20 connected to a power source, such as battery 21, an electric field forms in the inter cell gaps 17 and 18. The ions flowing from the anode 13 cause the plate 16 of the field electrode to act as a cathode. The electrons then travel along member 16*a* of field electrode 15 to the plate 16*a*, which forms an anode relative to the cathode 14. Thus, a single coulomb of charge is used twice in this device and hence a higher voltage and lower current can be employed to produce hydrogen. When power is applied to the anode and cathode by means of wires 19 and 20 respectively from the battery 21, current flows through the circuit and ions in the electrolyte solution, e.g., a potassium hydroxide solution, flow through inter cell gaps 17 and 18. The inter cell gaps 17 and 18 may be between 0.005 inches and 2 inches, and preferably 0.005 inches to 0.250 inches, more preferably between 0.005 inches and 0.1 inches and most preferably 0.1 to 0.6 inches. In a particularly preferred embodiment, the gaps 17, 18 are about 0.025 inches. The field electrode therefore serves as both an anode on one side and a cathode on the other side. The intra cell gap 22 is preferable between 0.050 to 2 inches, more preferably 0.075 to 0.75 inches, and most preferably 0.125 to 0.5 inches.

A flow channel or gap 23 is preferably provided to connect the inter cell and intra cell gaps in flow communication with a source of fluid (e.g. a liquid reservoir) which is used to replace the liquid that is converted to gas. Preferably, the flow channel is positioned below the electrodes. Accordingly, in the preferred embodiment of FIG. 2, flow channel 23 is maintained between the bottom of the chemically inert electrically insulating container 11 and the bottom edges of the field electrode 15, which allows circulation of the electrolyte solution 12 in the intra cell region 22. A small electrical current may flow in the electrolyte in region 22. The heating of the anode, cathode, and field electrode cause convective currents. Allowing the electrolyte to circulate within intra cell region 22 assists in cooling the field electrode 15.

Alternatively, forced circulation may be induced, such as by using a pump or impeller member 24 attached to motor 25 for producing fluid circulation to enhance the circulation in region 22 thereby further cooling the field electrode 15. It will also be understood that the motor 25 for the circulation means may be placed outside the chemically inert electrically insulating container 11 with the drive shaft either magnetically coupled to the pump or impeller member 24 or the drive shaft protruding through the wall support by a liquid tight bushing and directly driving the pump or impeller member 24.

One advantage of this aspect of the design is that, for a given production of hydrogen and oxygen, a higher voltage and lower current may be applied to the electrolyzer. The electrolyzer may be operated on household current. Thus, for North America, the product may operate on 120V and, for Europe, the product may operate on 220-240V. Preferably, the electrolyzer is designed to operate on the lowest voltage that may be delivered in a particular location. Thus, for North America, the product may operate on 100V and, for Europe, the product may operate on 200V.

By utilizing a high voltage, a low current may be utilized. The current that is required may be determined based on the voltage of the electrical supply, the required power to be delivered to the electrodes, the electrode plate area and the spacing between the electrodes. For example, a typical appliance may employ 100V applied to the electrolyzer at a current that is determined by the electrode plate area and spacing, which is selected to produce the desired power level. Thus for 300 W, 3 A of power may be consumed. A conventional electrolyzer typically operates at 3-5V and requires transformer to supply 100 A @3V or 60 A @ 5V to produce 300 W. The wiring losses, heat build up, weight and bulk of the transformer and associated high current low voltage wiring are thus avoided.

In a further alternate embodiment, a solid dielectric such as polyethylene may be placed into the intra cell gap 22 to modify the dielectric characteristics of the electrolyzer to enhance efficiency under certain operating pressure and temperature ranges.

Figure 3:
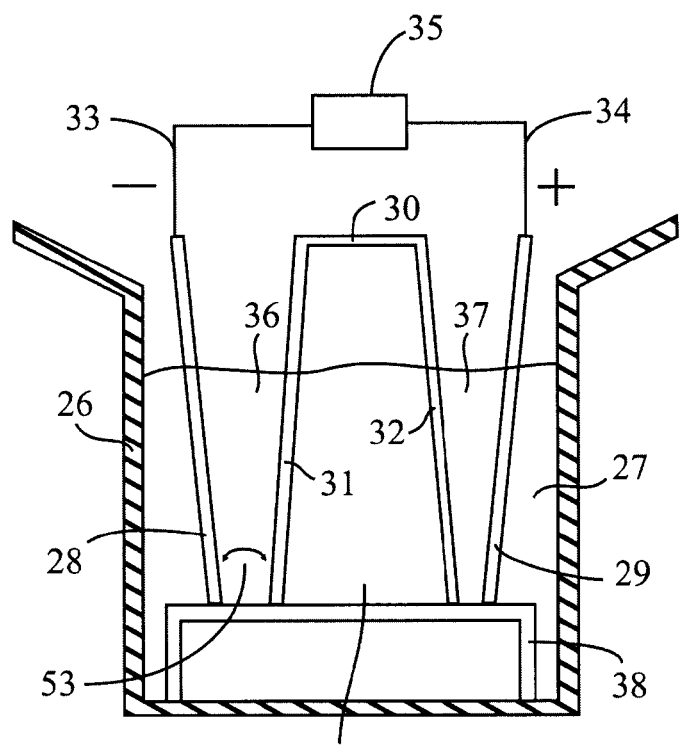
FIG. 3 is a section view of an alternate embodiment of the electrolysis cell.

FIG. 3 is a sectional view of a further alternate embodiment of the electrolyzer wherein a chemically inert electrically insulating container 26 is at least partially filled with an electrolyte solution 27, in which the anode 28, the cathode 29, and the field electrode 30 are at least partially immersed. The field electrode 30 in this preferred embodiment is made of a thin material bent back upon itself so as to form a generally U shaped member having two plates defining electrodes 31 and 32. When potential is applied to the anode 28 and the cathode 29 by means of wires 33 and 34 respectively connected to a power source, such as DC electrical generator 35, an electric field forms in the inter cell gaps 36 and 37. The ions flowing from the anode 28 cause the plate 31 of the field electrode 30 to act as a cathode. The electrons then travel along and/or through the field electrode 30 to the plate 32, which forms an anode relative to the cathode 29.

In this embodiment, at least one, and preferably each, inter cell gap 36 and 37 are wider at the top than at the bottom to facilitate a more even current flow across the gaps when hydrogen and oxygen bubbles begin to be formed thereby changing the effective mean path length of the gaps 36 and 37 as the gas bubbles displace electrolyte. For example, as hydrogen and oxygen are formed, the gas bubbles occupy part of the volume in the inter cell gaps. The greater the distance from the bottom of the electrolyzer, the greater the number of bubbles in the gaps. By increasing the width of the gap as the distance from the bottom increases, the hydrogen and oxygen production rates per unit power input increase.

Figure 4:
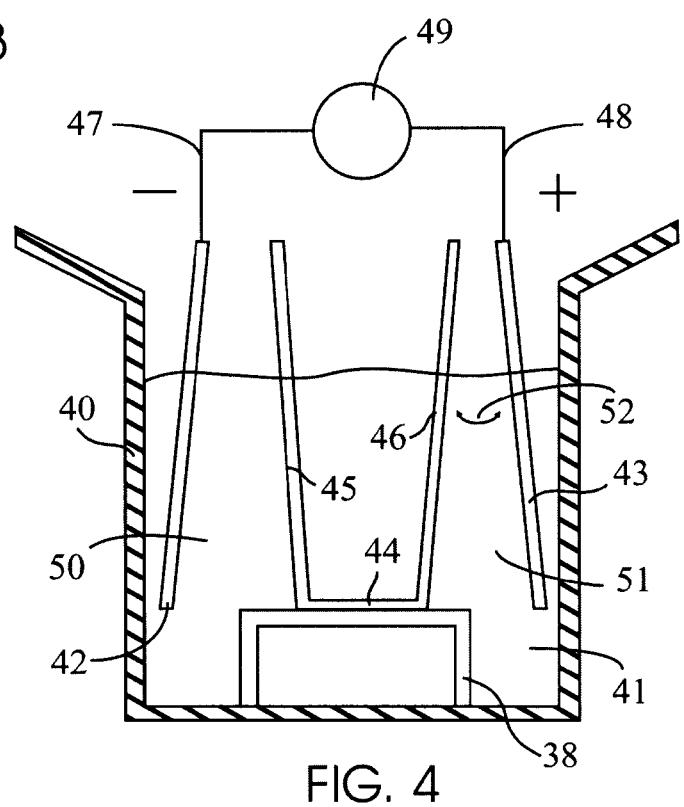
FIG. 4 is a section view of an alternate embodiment of the electrolysis cell.

As exemplified in FIGS. 3 and 4, in any embodiment, the field electrode 30 may be supported a fixed distance away from the bottom of the chemically inert electrically insulating container 26 by any means known in the art, such as by support member 38 which is configured not to prevent or significantly impede the flow of electrolyte into and out of the intra cell gap 39 (e.g. support member 38 may have an upper surface that is a grate). The inter cell gaps 36 and 37 accordingly form an upward V with an internal included angle 53 of preferably 0.1° to 45°, more preferably 2° to 20°, and most preferably 4° to 12°.

In addition, in this embodiment, the terminal ends of the field electrode 30 (e.g. adjacent support member 38), may be thinner than the end where the plates 31 and 32 are joined because the maximum current passes through the bridge between the plates while the least current passes through the terminal ends. This provides a means of reducing the cost and weight of material used to construct the field electrodes.

FIG. 4 is a sectional view of a further alternate embodiment of the electrolyzer wherein a chemically inert electrically insulating container 40 is partially filled with an electrolyte solution 41, in which the anode 42, the cathode 43, and the field electrode 44 are at least partially immersed. The field electrode 44 in this preferred embodiment is made of a thin material bent back upon itself so as to form a generally U shaped member having two plates 45 and 46. When potential is applied to the anode 42 and the cathode 43 by means of wires 47 and 48 connected to a power supply, e.g. DC power supply 49, an electric field forms in the gaps 50 and 51. When power is applied to the anode 42 and cathode 43 by means of wires 47 and 48 respectively from the DC power supply 49, current flows through the circuit and ions in the electrolyte solution flow through inter cell gaps 50 and 51. By decreasing the width of the gap as the distance from the bottom increases, the hydrogen and oxygen production rates per unit power input increase.

In this embodiment, the inter cell gaps 50 and 51 are wider at the bottom than at the top to facilitate more even current flow across the gaps when hydrogen and oxygen bubbles begin to be formed thereby changing the effective mean path length of the gaps 50 and 51 as the gas bubbles displace electrolyte. This geometry angle varies with the operating temperature and pressure as this changes the size of the gas bubbles formed in the electrolyte by the dissociation of water. The gaps 50 and 51 form a downward V with an internal included angle 52 of preferably 0.1 to 45°, more preferably 2 to 20°, and most preferably 4 to 12°.

Figure 5:
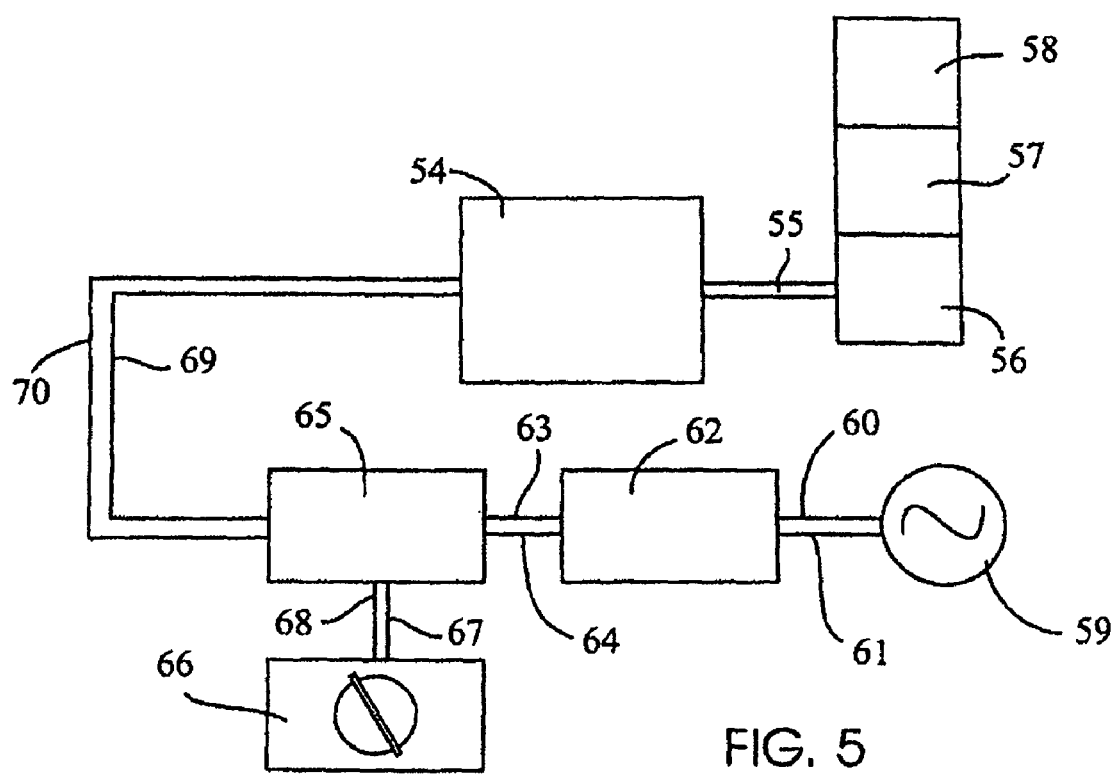
FIG. 5 is a schematic diagram for an apparatus that uses an electrolysis cell.

FIG. 5 shows a schematic diagram for an apparatus that uses an electrolysis cell 54 in accordance with another aspect of this invention. As shown therein electrolysis cell or electrolyzer 54 is connected through a connecting tube 55, an optional water de-mineralizing cartridge 56, and an optional water filter 57, to a screw cap water filler 58. The power for the electrolysis cell is provided from household current, e.g., 120 VAC standard wall outlet 59, which is connected by wires 60 and 61 to the DC rectifier 62, which is in turn connected by wires 63 and 64 to a pulse width modulation electronics unit 65, which reduces the voltage and current. This pulse width modulation electronics unit 65 may operate at a fixed mark-space ratio or it may alternatively incorporate a control member 66 connected to the pulse width modulation electronics unit 65 by wires 67 and 68 to allow the voltage and current delivered to the electrolysis cell 54 through wires 69 and 70 to be varied thereby varying the hydrogen and oxygen production rate. It is known and understood that the two wires 67 and 68 connecting the control member 66 to the pulse width modulation electronics 65 may be three or more wires or may be an optical fiber or other means known in the art. Any other type of SCR or other interference waveform power reduction scheme could also be used to provide power to the bridge rectifier means to reduce the voltage and current supplied to the electrolyzer.

Figure 6:
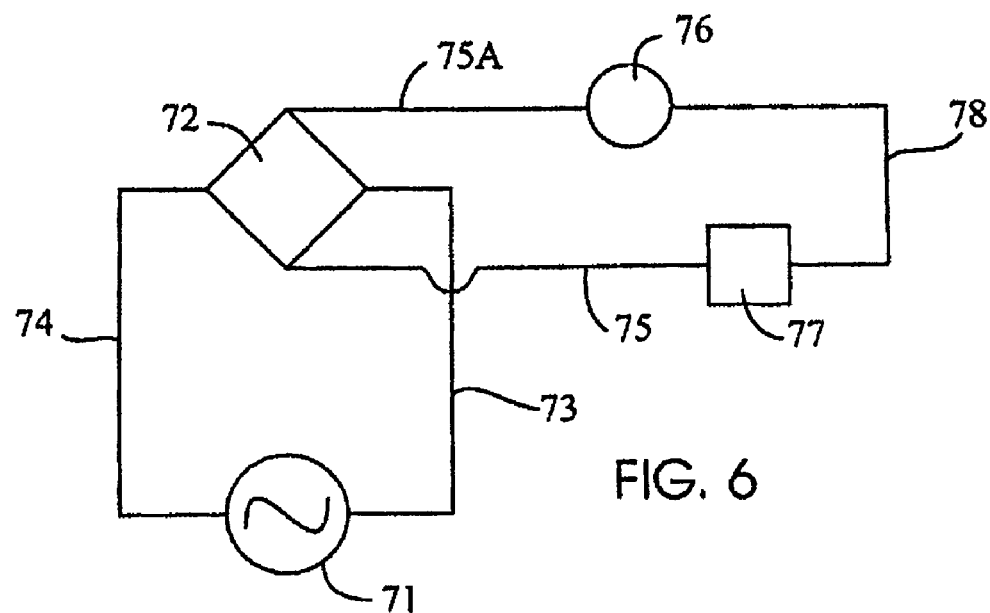
FIG. 6 is a schematic diagram for an alternate apparatus that uses an electrolysis cell.

FIG. 6 shows an alternate schematic diagram for an apparatus that uses an electrolysis cell or electrolyzer 77 in accordance with another aspect of this invention. As shown therein, a high voltage AC source 71 which may be 120 VAC, 220 VAC, 240 VAC or other common voltages is connected to a bridge rectifier or other AC to DC converter 72 by wires 73 and 74. The output from the bridge rectifier or other AC to DC converter 72 is connected by wires 75a and 75 to motor 76 and electrolysis cell 77. Motor 76 and electrolysis cell 77 are connected in series by wire 78. This motor 76 can be a fan motor used to cool the electrolyzer or to distribute the waste heat from the electrolyzer for use in space heating, hot water heating, swimming pool heating, or other industrial heating applications where low grade heat is suitable. This motor 76 can be a compressor to compress some or all of the hydrogen and or oxygen output from the electrolyzer 77 for storage. This motor 76 can also be driving a cryocooler for liquefying the hydrogen and or oxygen for storage.

Figure 7:
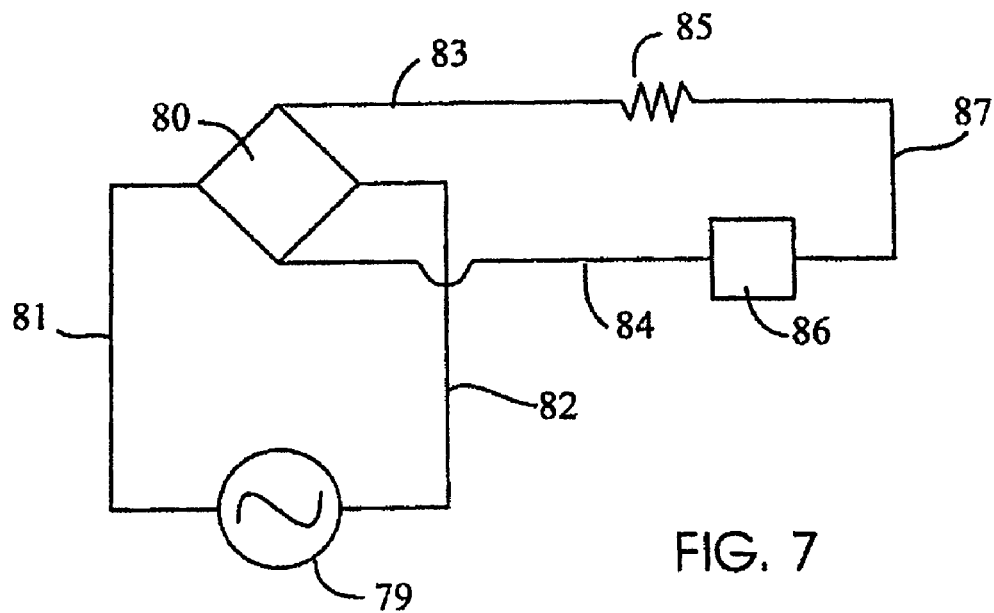
FIG. 7 is a schematic diagram for an alternate apparatus that uses an electrolysis cell.

In FIG. 7 shows an alternate schematic diagram for an apparatus that uses an electrolysis cell 86 in accordance with another aspect of this invention. As shown therein, a high voltage AC source 79 which may be 120 VAC, 220 VAC, 240 VAC or other common voltages is connected to a bridge rectifier or other AC to DC converter 80 by wires 81 and 82. The output from the bridge rectifier or other AC to DC converter 80 is connected by wires 83 and 84 to an electrical resistor 85 and an electrolysis cell 86. Electrical resistor 85 and electrolysis cell 86 are connected in series by wire 87. This electrical resistor could be used to provide radiant heat or contact heating for cooking food in an appliance which burns some or all of the hydrogen and oxygen created by the electrolyzer to create a flame to create a combination of radiant heating and or contact food heating combined with a hydrogen flame to create an indoor or outdoor pollution free flame grilling apparatus. The grilling apparatus may be portable, i.e., it may be a countertop cooking apparatus that can be plugged in to any standard household AC outlet. The heat from the electrical resistor can also be used for any domestic or industrial application where high grade heat is needed in addition to hydrogen and or oxygen production by electrolysis.

It will be appreciated that the aspects of the inventions set out in FIGS. 5-7 may use any electrolyzer known in the art and preferably any electrolyzer disclosed herein.

It will also be appreciated that the power source preferably provides one of constant voltage, constant current and constant power, and more preferably constant power.

Figure 8:
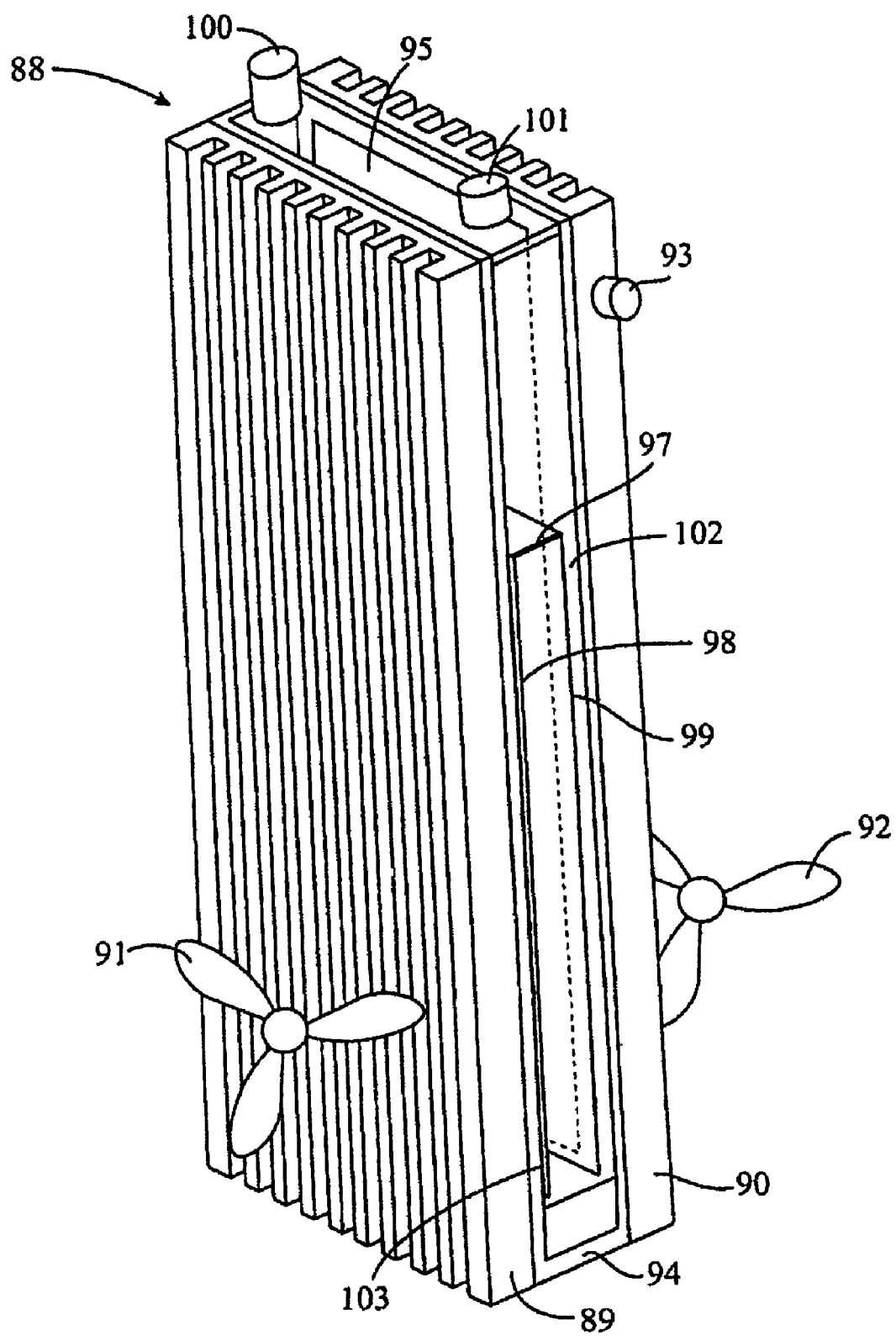
FIG. 8 is a perspective view of an electrolysis cell.
Figure 9:
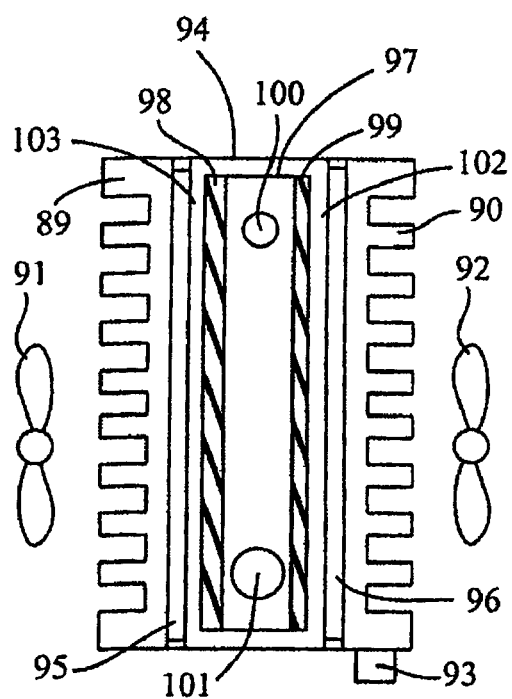
FIG. 9 is a top plan view of the electrolysis cell of FIG. 8.
Figure 10:
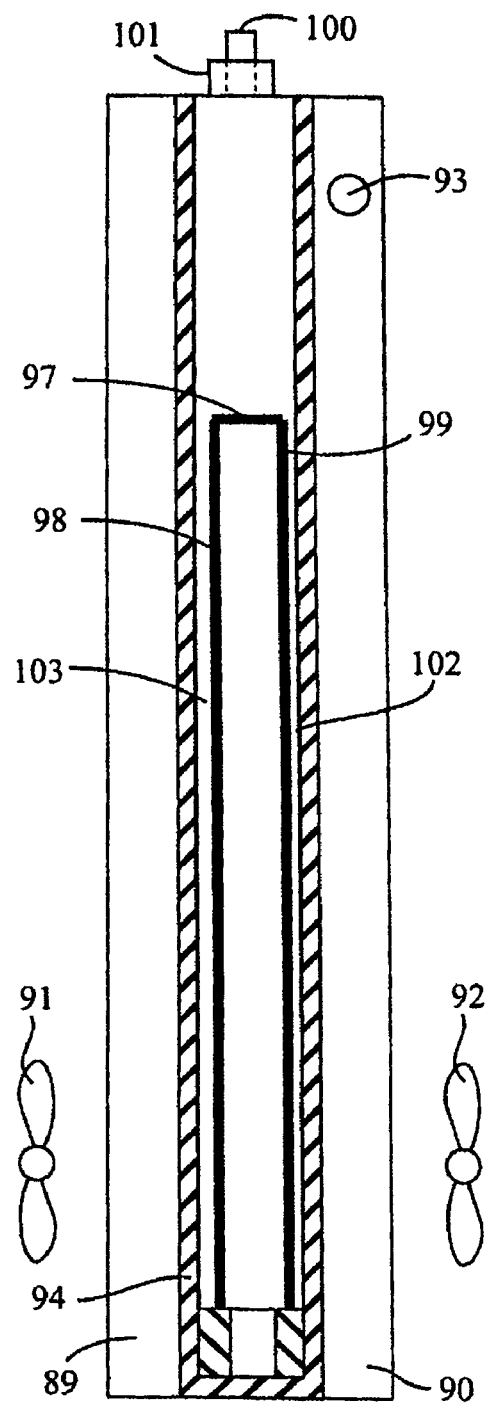
FIG. 10 is a side elevation view of the electrolysis cell of FIG. 8.

FIGS. 8, 9 an 10 shown an alternate embodiment of an overall construction of an electrolysis cell 88 according to an aspect of this invention. This embodiment exemplifies the use of a heat sink with an electrolyzer. In particular, as shown herein, a heat sink is positioned on the outer surface of the electrolysis cell to cool each of the anode and the cathode. Accordingly, a heat sink is positioned adjacent each opposed end of the electrolysis cell. In an alternate embodiment only an anode heat sink or a cathode heat sink need be provided.

As shown in FIGS. 8, 9 an 10, the anode 89 and the cathode 90 are formed as a finned heat sink. One or more fans 91 and 92, and preferably two fans (one adjacent each opposed end of electrolysis cell 88), may be positioned to cause air to flow along or against the heat sinks so as to produce forced convective cooling of the heat sinks. The one or more fans may be activated by a thermostatic bimetallic switch or other temperature sensor and switch 93 which closes the fan circuit when the anode heat sink 89 reaches, e.g., 150 to 170° F. and disengages when the cell reaches, e.g., 125 to 135° F. Alternatively, the temperature could be measured at the cathode heat sink 90. The chemically inert electrically insulating container 94 has openings 95 and 96 to allow the electrolyte to be in communication with the surface of the anode 89 and the cathode 90. The field electrode 97 incorporates surface 98, which acts as a cathode, and surface 99, which acts as an anode. The electrolysis cell 88 also incorporates a gas outlet 100 and a screw cap covered water filler 101. The electric field forms in inter cell gaps 102 and 103. The anode and cathode can either be adhered to, bolted to, riveted to, or otherwise mechanically fastened or both adhered and mechanically fastened bolted to the chemically inert electrically insulating container 94.

Figure 11:
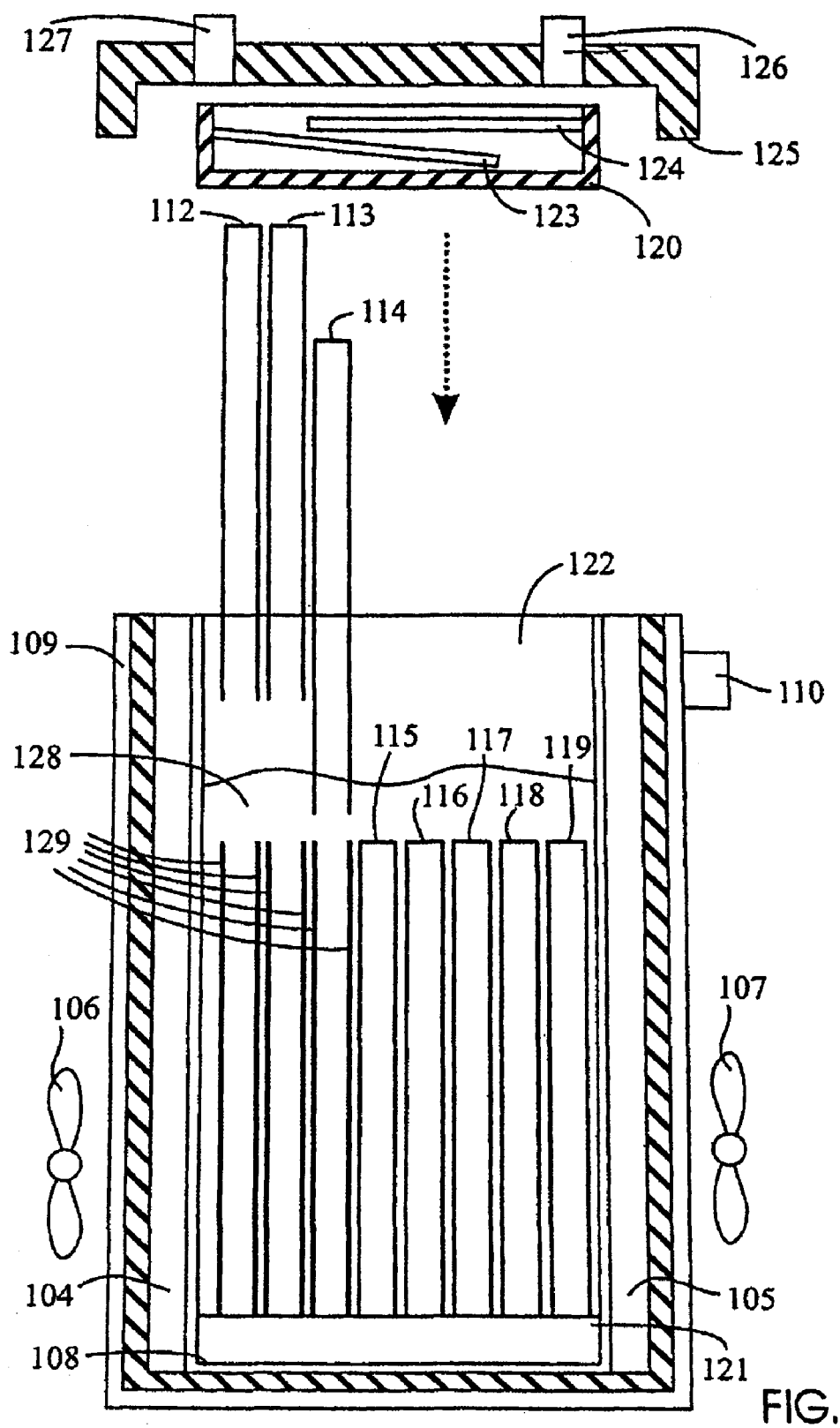
FIG. 11 is a side view of an alternative embodiment of an electrolysis cell.
Figure 13:
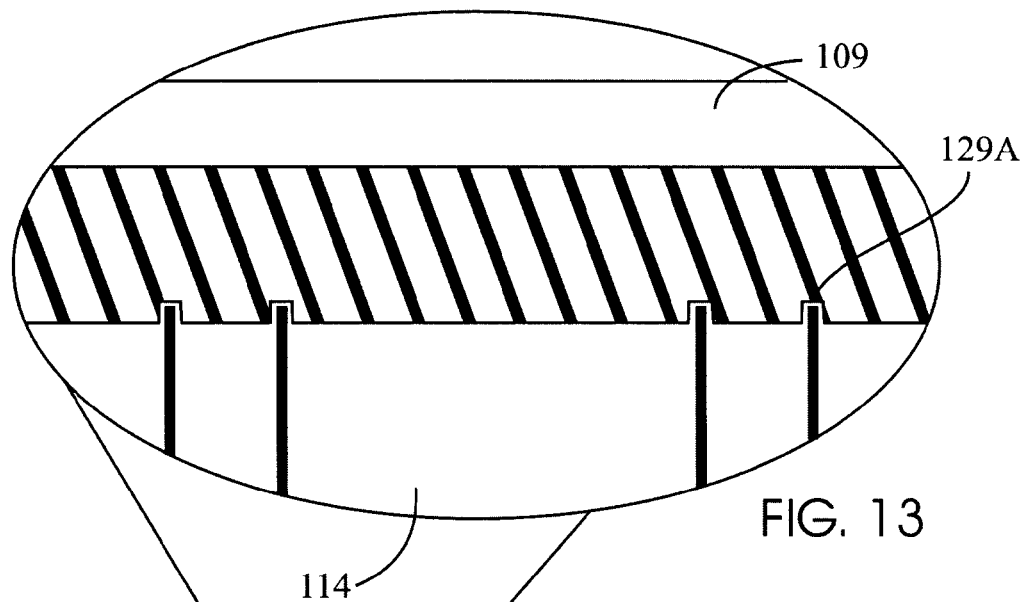
FIG. 13 is a an alternative embodiment based on the electrolysis cell of FIG. 11.
Figure 12:
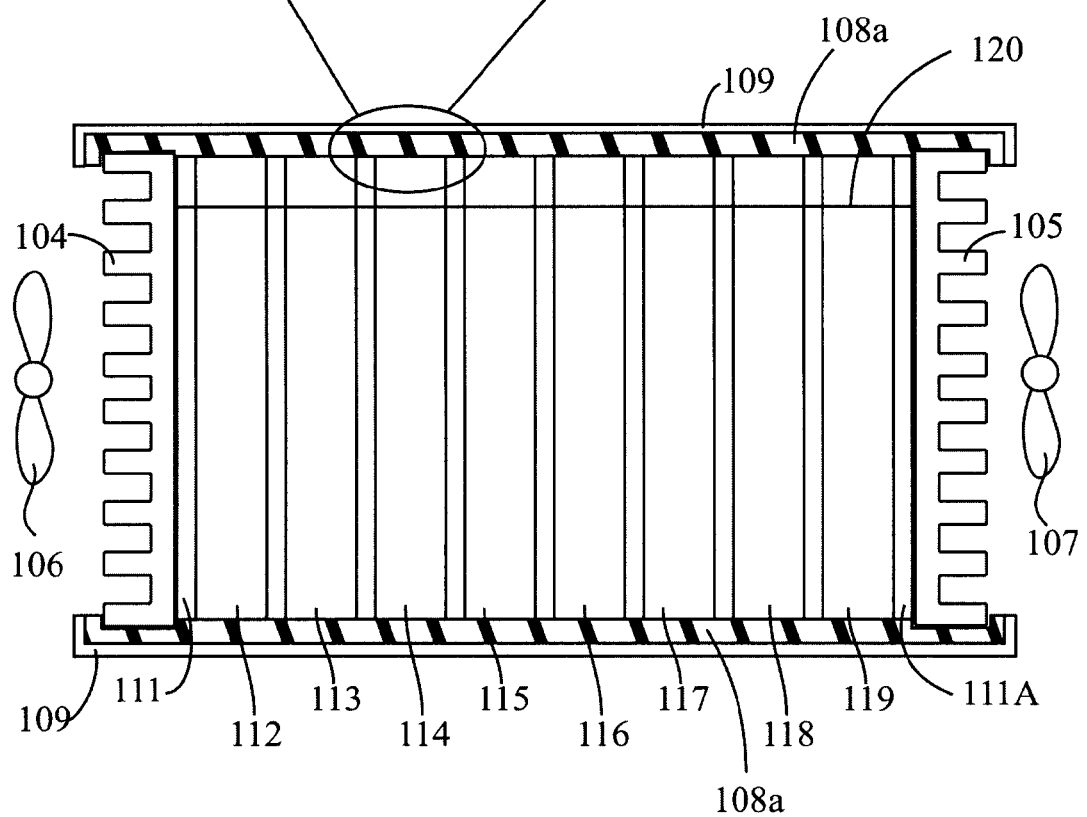
FIG. 12 is a top view of the electrolysis cell of FIG. 11.

FIGS. 11, 12 and 13 show an alternate embodiment of a multi-cell electrolysis unit in accordance with another aspect of this invention. As shown therein, the anode 104 and the cathode 105 are formed as a finned heat sink. One or more fans 106 and 107, and preferably two fans (one adjacent each opposed end of the electrolysis cell), may be positioned to cause air to flow along or against the heat sinks so as to produce forced convective cooling of the heat sinks. The one or more fans may be are preferably activated by a thermostatic bimetallic switch or other temperature sensor and switch 110 which closes the fan circuit (not shown) when the anode heat sink reaches a temperature at which, e.g., optimum performance in terms of output or efficiency is reached, e.g., 175 to 185° F. and disengages when the cell reaches a lower temperature, e.g., 160 to 170° F. to ensure that an optimal operating range is maintained.

Alternately, or in addition, a pressure sensor is preferably attached to the interior space of the electrolyzer, or a strain gauge attached to the outside of the electrolyzer measuring the case bending forces applied to the case by the interior pressure, or any other pressure sensing member, can be used to control the operation of the electrolyzer within a range of pressure to achieve the desired gas output volume or energy efficiency, or both. For example, a small electrolyzer to produce hydrogen or oxygen or both for use wherein the gas is consumed at a rate approximately equal to the rate at which it is produced would operate between a lower pressure of, e.g., 1 psi to an upper pressure of 150 psi, preferably between a lower pressure of 1 psi and an upper pressure of 60 psi, more preferably between a lower pressure of 2 psi and an upper pressure of 25 psi, still more preferably between a lower pressure of 2.5 psi and an upper pressure of 15 psi, and most preferably between a lower pressure of 3 psi and an upper pressure of 6 psi above ambient pressure.

The embodiment of FIGS. 8, 9 an 10 or the embodiment of FIGS. 11, 12 and 13 may be used in any application disclosed herein and may utilized any of the construction features set out herein.

In accordance with another aspect of this invention and as exemplified in FIG. 11, the chemically inert electrically insulating container 108 may incorporate a reinforcing outer housing 109 which is not in electrical contact with the anode 104, cathode 105, or electrolyte solution 128 and which may be made of aluminum, steel, brass, stainless steel or any other suitable metal or other structural materials such as fiberglass, or carbon fiber. The chemically inert electrically insulating container 108 has openings or gaps 111 and 111a shown in FIG. 12 only, to allow the electrolyte 128 which fills all or a portion of the interior void volume of the chemically inert electrically insulating container 108, to be in fluid communication with the surface of the anode 104 and the cathode 105.

In accordance with another aspect of this invention and as exemplified in FIGS. 11-13, a preferred method of assembling an electrolyzer cell is alternately provided. In accordance with this alternate aspect, the field electrodes are inserted, more preferably inserted such that they can be removed, into the electrolysis cell. Accordingly, the chamber may contain retaining members positioned to receive the filed electrodes and, preferably, to removably receive the field electrode. The retaining members may be of any construction that would function to hold a filed electrode in position in the chamber. For example, the retaining members may be a plurality of spaced apart slots 129 within the walls of the chemically inert electrically insulating container 108. As shown in FIG. 11, the field electrodes 112, 113, and 114 are being inserted into place while field electrodes 115, 116, 117, 118, and 119 are shown already in place.

If the retaining members do not secure the electrodes in position, then the electrolyzer preferably also includes a member to maintain the electrodes in position. For example, as exemplified in FIG. 11, a hold down bar 120 is preferably inserted after the electrodes 112-119 have been inserted to prevent the field electrodes 112-119 from moving upward into the headspace 122 above the field electrodes 112-119. This head space is preferably 0.5 inches to 6 inches, more preferably 0.75 to 3 inches, and most preferably 1 to 2 inches high. It will be appreciated that a headspace need not be provided.

The electrode hold down bar 120 is preferably designed such that it will not interfere with the flow of gases produced by electrolysis. However, the hold down bar 120 may optionally incorporate one or more baffles 123, 124 that are configured to reduce and preferably eliminate liquid electrolyte being splashed or sloshed out of the one or more gas exit port 126 of the lid 125. The baffles are preferably either horizontal or angled downwards at an angle of 1° to 45° and more preferably 10° to 25° and most preferably 12° to 20° to permit filling the electrolyzer by means of the water filler cap 127, which is preferably openable and re-sealable.

A spacer 121 is preferably provided and configured to keep the field electrodes off the bottom of the chemically inert electrically insulating container 108 such that neither the field electrodes 112-119 nor the spacer 121 limit the recirculation of the electrolyte 128. Spacer may be a raised grate wherein the grates extend longitudinally or a step may be provided at the bottom of the longitudinally extending sidewalls of the container 108.

The electrolysis cell lid 125 preferably incorporates a gas outlet 126 and an openable and resealable water filler cap 127. Alternatively, the water filler cap 127 may be removable and replaceable wherein replacement reseals the unit. The unit could also incorporate a gas outlet 126 and an openable and resealable water filler cap 127 into the chemically inert electrically insulating container 108 and have a removable bottom to facilitate assembly if the slots 129 into which the field electrodes 112-119 are mounted were replaced with grooves 129a as shown in FIG. 13.

While this embodiment shows the use of eight field electrodes, it is advantageous to use between 1 and 300 field electrodes depending on the desired operating voltage and current versus the hydrogen production desired. Many small industrial and commercial applications will preferably employ 10-40 field electrodes. In one preferred embodiment, such as may be used in North America, the electrolyzer may have from 40 to 60 field electrodes and operate on 120V. In another preferred embodiment, such as may be used in Europe, the electrolyzer may have from 80 to 120 field electrodes and operate on 240V. In another preferred embodiment, then the electrolyzer may have from 4 to 6 field electrodes and operate on 12V.

The field electrodes in the embodiments disclosed herein may have an area from 0.25 square inches to 10,000 square inches. In small electrolyzers for automotive, light industrial and domestic applications, an electrode area of 6 to 24 square inches is preferred, and more preferably an area of approximately 6.75 to 13.75 square inches. Preferably the height of the electrode is 4.5 to 5.5 inches and the width is 1.5 to 2.5 inches. Each electrode may be less than 5 inches high by 5 inches wide, preferably less than 4 inches high by 4 inches wide, more preferably less than 3 inches high by 3 inches wide, and most preferably less than 2 inches high by 2 inches wide. The electrodes may have a height that is about twice to four times the width (e.g. 0.5 by 1 inch, or 0.5 by 2 inches). The height and width of the electrodes may be greater than 0.5 inches and more preferably, greater than 1 inch.

Figure 14:
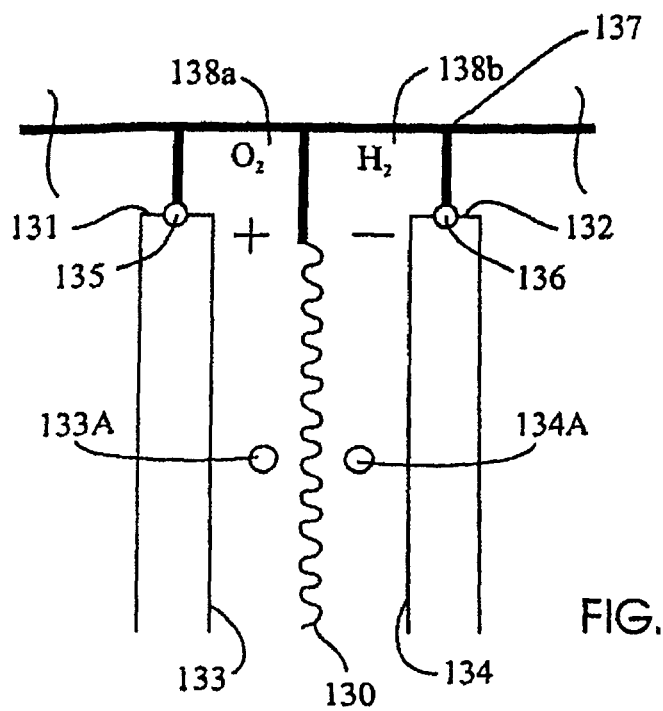
FIG. 14 is a side view of a portion of an electrolyzer according to any of the preferred embodiments of this invention with the addition of a member for separating the hydrogen and oxygen produced.

FIG. 14 exemplifies a method of dividing an electrolysis cell to separately capture hydrogen gas an oxygen gas according to another aspect of this invention. The method exemplified therein, may be used with any electrolyzer known in the art, and preferably one of those contemplated in any of the preferred embodiments of this invention. As exemplified therein, a mesh 130 is placed between two field electrodes 131 and 132 such that ions may freely pass between the anode and cathode surfaces, 133 and 134 respectively, yet the hydrogen bubbles 134a produced at the cathode surface 134 and the oxygen bubbles 133a produced at the anode surface 133 will not mix (i.e., will not pass through the mesh 130). The mesh 130 can be made of a chemically inert electrically non-conductive material such as polyethylene, fiberglass, ceramic, ceramic coated metal or cloth. The mesh 130 can also be made of an ion permeable gas impermeable material. The size of the openings in the mesh is preferably determined by the bubble size, which in turn may be controlled by the operating temperature, pressure and electrical current density. Operating at higher temperatures increases the bubble size, while operating at higher pressures decreases the bubble size. The mesh is preferably 0.1 to 10 times smaller than the bubble size, more preferably 0.25 to 4 times smaller, and most preferably 0.75 to 2 times smaller than the smaller of the bubbles of hydrogen or oxygen produced. As greater current densities that are applied, the hole size relative to the bubble size is preferably made smaller. Preferably, a manifold 137 or other separating member is provided to create a seal 135 and 136 at the top of the field electrodes and with the mesh 130 such that a manifold region 138a is created for oxygen and a manifold region 138b is created for hydrogen. The manifold 137 keeps the oxygen and hydrogen separated until they exit the electrolyzer, preferably though separate gas exit ports.

Figure 15:
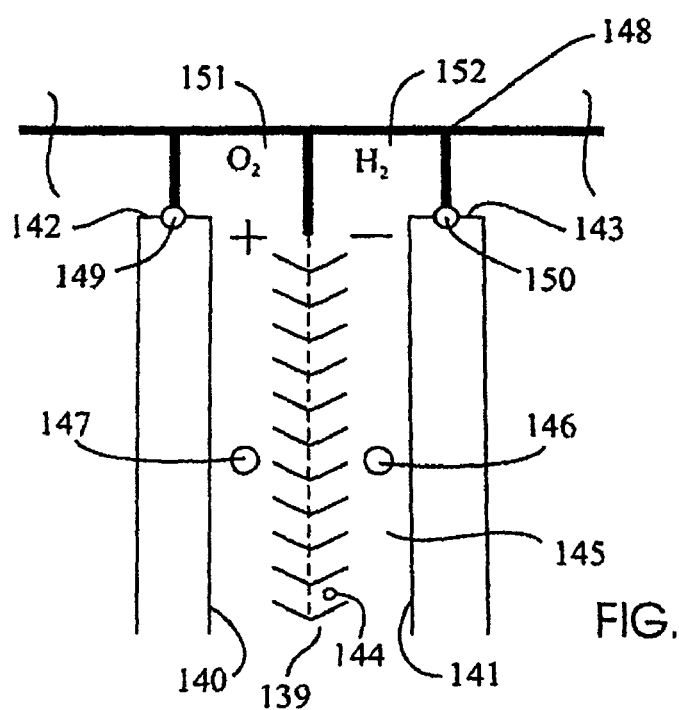
FIG. 15 is a side view of a portion of an electrolyzer according to any of the preferred embodiments of this invention with an alternate member for separating the hydrogen and oxygen produced added.

FIG. 15 exemplifies an alternate method of dividing an electrolysis cell to separately capture hydrogen gas an oxygen gas according to another aspect of this invention. The method exemplified therein, may be used with any electrolyzer known in the art, and preferably one of those contemplated in any of the preferred embodiments of this invention. As exemplified therein, an angled louvered member 139 is placed between the faces 140 and 141 of the two field electrodes 142 and 143 such that ions 144 of the electrolyte solution 145 may freely pass between the anode face 140 and cathode face 141 while the movement of hydrogen bubbles 146 produced at the cathode surface 141 and the oxygen bubbles 147 produced at the anode surface 140 will not mix (i.e., will not pass through the angled louvered member 139). The angled louvered member 139 may be made of a chemically inert electrically non-conductive material including but not limited to plastics such as polyethylene, polypropylene, ABS, acrylic or PVC (polyvinyl chloride), fiberglass, ceramic, porcelain, glass or an insulation coated metal. The size of the openings between the louvers is preferably determined by a consideration of one or more, and preferably all, of the applied current, louver angle, the operating temperature, the operating pressure and the electrical current density at the electrodes. Operating at higher temperatures increases the bubble size, while operating at higher pressures decreases the bubble size. The openings in louver member 139 are preferably 0.1 to 10 times smaller than the bubble size, and more preferably 0.5 to 8 times smaller, and most preferably 1.5× to 4 times smaller than the smaller of the bubbles of hydrogen or oxygen produced. Thus, the openings in the angled louvered member 139 can be larger than the openings in the mesh 130 resulting in less resistance to ion flow. The angle of the louvers 139 may be between 1° to 89°, preferably between 10° to 75°, more preferably between 15° to 45° and most preferably between 20° to 30°. Preferably, a manifold 148 or other separating member is provided to create a seal 149 and 150 at the top of the field electrodes 142 and 143 and with the angled louvered member 139. Alternatively, the angled louvered member may be integral with the manifold 148. The manifold 148 also incorporates a manifold region 151 and 152 for keeping the oxygen and hydrogen created by electrolysis separate. The manifold 148 keeps the oxygen and hydrogen separated until they exit the electrolyzer, preferably though separate gas exit ports.

Figure 16:
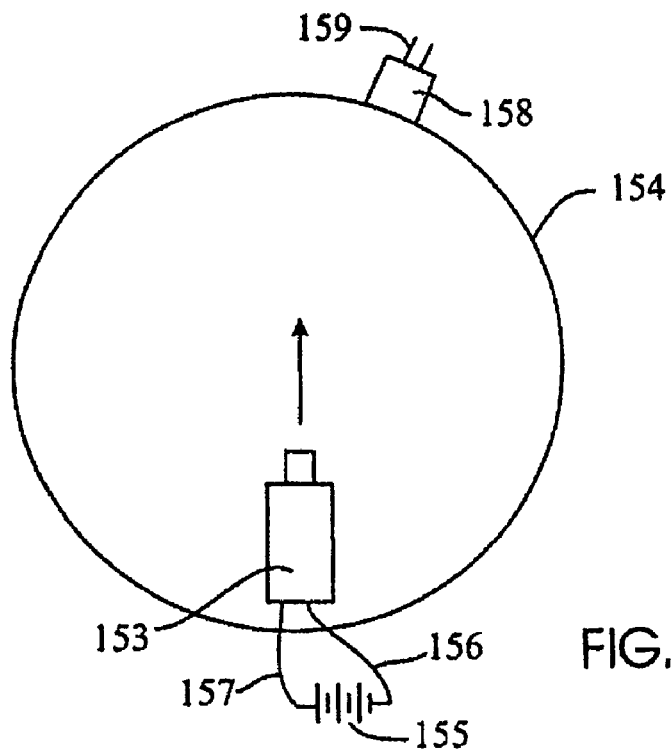
FIG. 16 is a side view of an electrolyzer and hydrogen and oxygen storage container.
Figure 17:
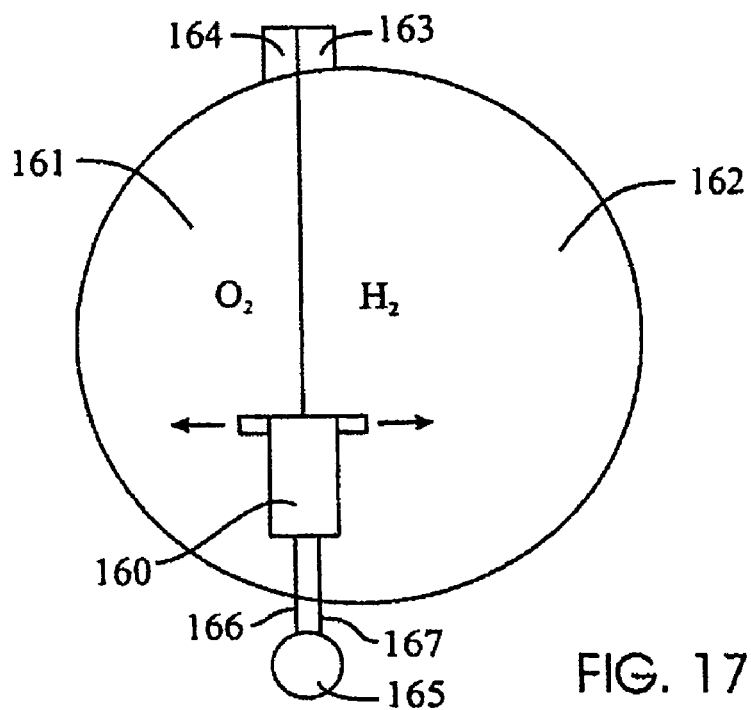
FIG. 17 is a side view of an alternate embodiment of an electrolyzer and hydrogen and oxygen storage container.

In accordance with a further alternate aspect of this invention, as exemplified in FIGS. 16 and 17, the electrolyzer may be positioned in a gas storage chamber to thereby reduce the pressure that may be experienced by the outer housing of the electrolyzer. For example, FIG. 16 shows an electrolyzer 153 mounted in a sealed chamber 154 and connected to the battery 155 by means of wires 156 and 157 which penetrate the wall of the chamber 154 but whose penetrations are gas tight. When power is applied to the electrolyzer, the combined oxygen and hydrogen flow pressurizes the sealed chamber 154 thereby providing a container for storing the hydrogen and oxygen mixture. The valve 158 provides a method of withdrawing the hydrogen and oxygen mixture through, e.g., hose 159 as it is needed. Thus, the electrolyzer is not subjected to the pressure differential experienced by the sealed chamber 154 as the hydrogen and oxygen gas pressure builds up.

FIG. 17 shows an electrolyzer 160 mounted between the two sealed chambers 161 and 162 which are preferably proportioned to have a volume ratio of 2:1, based on the fact that water contains 2 parts hydrogen and 1 part oxygen. Thus, the larger hydrogen storage chamber 162 and the smaller oxygen storage chamber 161 may both stay at the same pressure throughout the process of storing the hydrogen and oxygen. The valves 163 and 164 preferably allow the proportional withdraw of two parts hydrogen and one part oxygen thereby maintaining the system pressure in chambers 161 and 162 as equal. The electrolyzer 160 is connected to a power source, e.g., battery 165, by means of wires 166 and 167, which penetrate the wall of the chamber 161 but whose penetrations are gas tight. Thus, the electrolyzer is not subjected to the pressure differential experienced by the sealed chambers 161 and 162 versus the outside environment as the hydrogen and oxygen gas pressure builds up.

Figure 18:
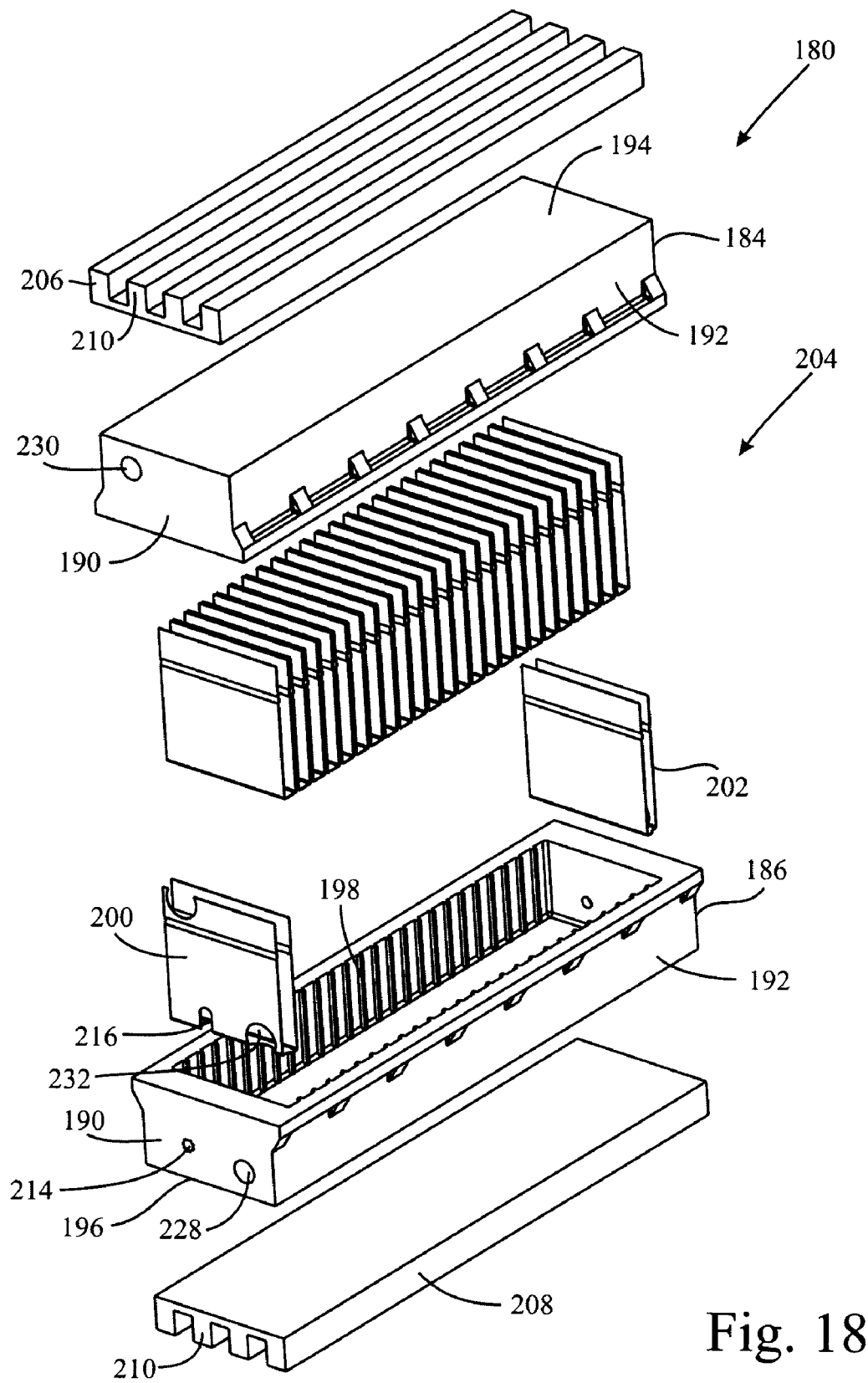
FIG. 18 is an exploded perspective view of an alternate embodiment of an electrolyzer according to the instant invention.
Figure 19:
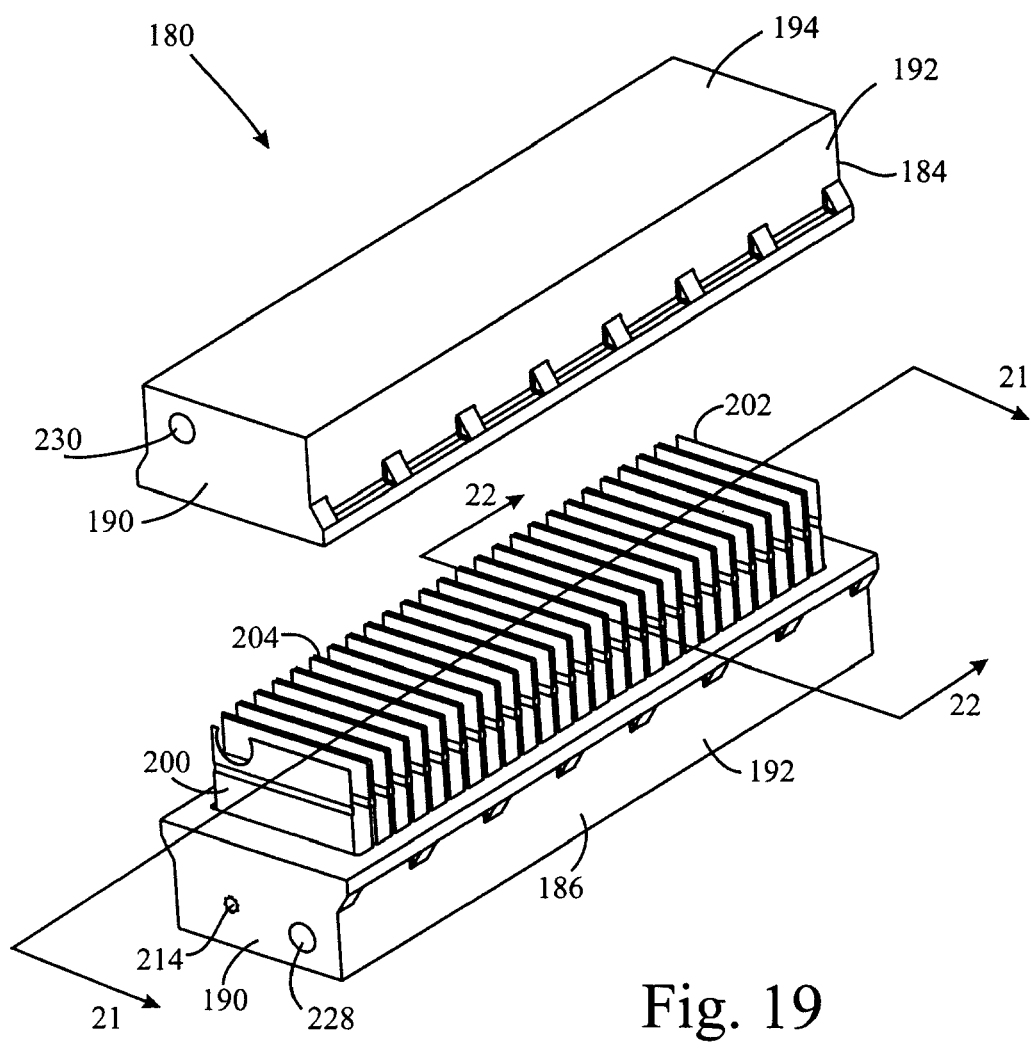
FIG. 19 is a partially exploded perspective view of the electrolyzer of FIG. 18.

FIGS. 18-22 exemplify various aspects of the constructions of an electrolyzer in accordance with another embodiment of the instant invention. As shown thererin, electrolyzer 180 comprises an outer housing 182 comprising an upper portion or lid 184 and a lower portion 186. When upper portion 184 is secured to lower portion 186, an internal chamber 188 which houses the electrodes and the electrolyte solution is provided. It will be appreciated that outer housing 182 may be of any particular shape and, as shown in FIG. 18, the housing is preferably generally rectangular having spaced apart opposed end walls 190, longitudinally extending spaced apart sidewalls 192, top 194 and bottom 196.

Chamber 188 receives a plurality of electrodes comprising anode 200, cathode 202 and a plurality of field electrodes 204 positioned between anode 200 and cathode 202. Preferably, as shown in FIG. 18, each of the electrodes comprises a generally U-shaped member. Further, the interior surface of each longitudinally extending wall 192 preferably contains a plurality of vertically extending slots 198. Therefore, in accordance with one alternate aspect of this invention, electrodes 200, 202 and 204 are removably slidably receivable in slots 198.

Figure 23:
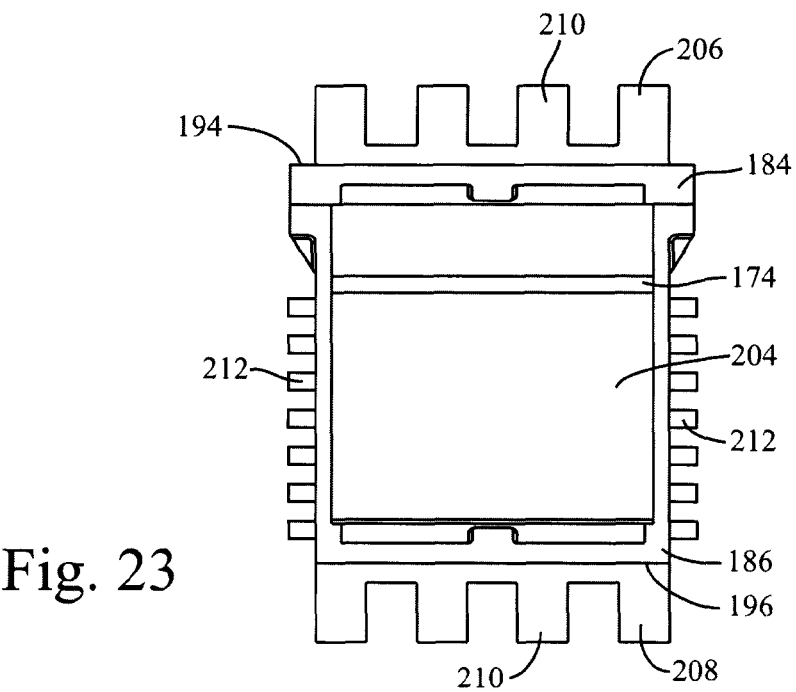
FIG. 23 is a cross section along the line 22-22 of an alternate embodiment of the electrolyzer of FIG. 19.

In accordance with another alternate aspect of this invention, a heat sink may be provided on one or more external surface of outer housing 182. As exemplified in FIG. 18 an upper heat sink 206 and a lower heat sink 208 are provided. Heat sinks 206 and 208 may be of any construction and may be made of any material known in the heat transfer art. As shown in FIG. 18, each heat sink includes a plurality of heat radiating fins which assist in dissipating heat from heat skin 206, 208. It will be appreciated that heat sinks may also or alternately be provided on longitudinally extending sidewalls 192 (see for example sidewall heat sinks 212 as shown in FIG. 23).

In accordance with one particularly preferred alternate aspect of this invention, the heat sinks are made of plastic. Accordingly, it is particularly preferred that the heat sinks are formed integrally as part of upper and or lower portions 184, 186 of outer housing 182. Accordingly, the heat sinks may be provided at the same time as outer housing 182 is prepared.

It will be appreciated that, as shown in FIGS. 18-22, upper and lower portions 184, 186 may each define part of the vertical height of interior chamber 188. Alternately, it will be appreciated that upper portion 184 may merely comprise a lid (see for example FIG. 23). Outer housing 182 may optionally comprise more than two pieces. The pieces which form the outer housing may be secured together by any means known in the art and the technique which is utilized will vary depending upon the material from which the outer housing is constructed. Accordingly, the outer housing may be secured together by a chemical adhesive (e.g. glue), a mechanical affixing means (e.g. bolts or and external bracket), or the surfaces may be treated so as to secure to each other (e.g. hot plate welding, ultrasonic welding and heat fusing).

Figure 20:
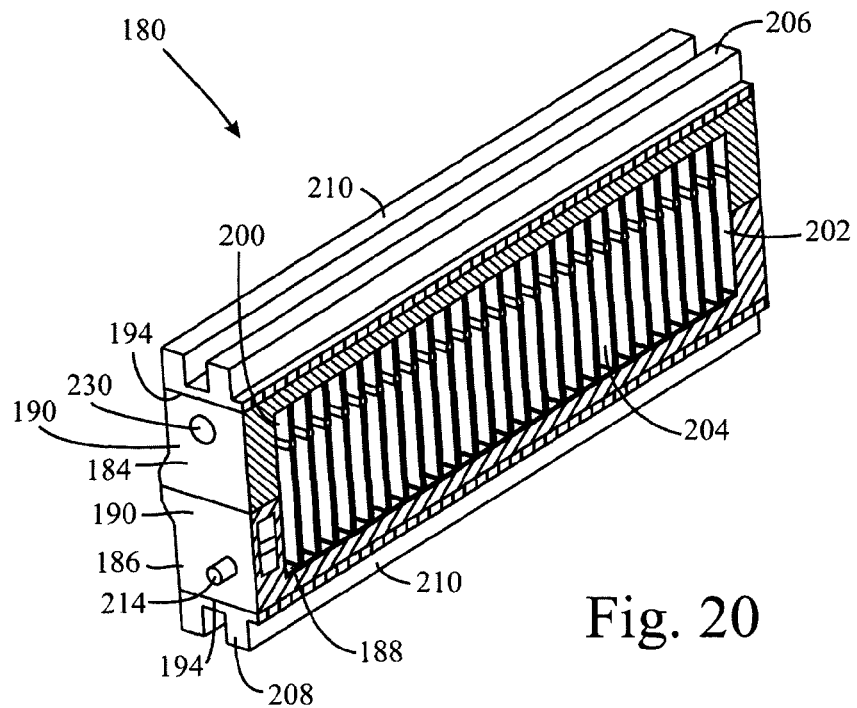
FIG. 20 is a perspective view of the electrolyzer of FIG. 18 when viewed from the cross section along the line 21-21 in FIG. 19.
Figure 21:
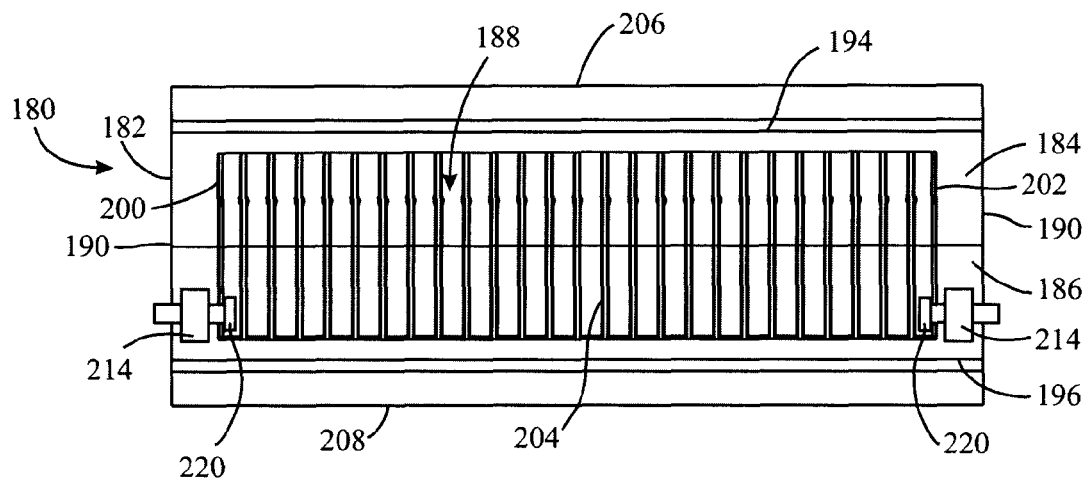
FIG. 21 is a cross section along the line 21-21 in FIG. 19.
Figure 22:
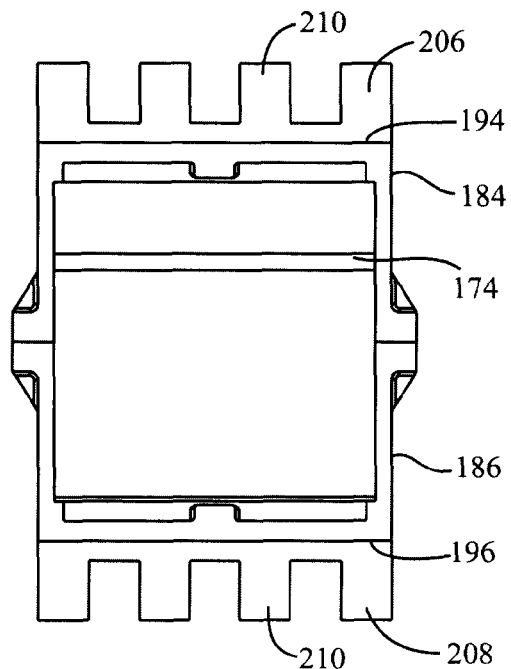
FIG. 22 is a cross section along the line 22-22 in FIG. 19.

In accordance with another alternate aspect of the instant invention, which is exemplified in FIGS. 20 and 21, the anode and cathode 200, 202 may be electrically connected to a power source by a member which is formed in situ in outer housing 182. For example, if outer housing 182 is constructed from plastic, then an electrically conductive member may be molded in situ (e.g. the electrically conductive member may be placed in a mold such that, when plastic is injected into the mold and the mold is cooled, the electrically conductive member is formed in a wall of the outer housing 182. Accordingly, a water tight seal may be provided at the same time as the housing is prepared.

In accordance with another alternate aspect of this invention, at least one of, and, preferably both of, anode and cathode 200, 202 are constructed to be electrically connected to electrically conductive members 214 when the anode and cathode are inserted into chamber 188. For example, anode 200 and cathode 202 may be configured to contact electrically conductive member 214 when inserted into chamber 188. An exemplified construction is shown in FIGS. 25 and 26. As shown therein, an electrode is provided with a recess 216. Electrically conductive member 214 has a longitudinally extending member 218, which may be threaded to receive bolt 220. Accordingly, once lower portion 186 has been molded, bolt 220 may be inserted onto the threaded end of longitudinally extending member 218. Anode 200 may be an inserted into chamber 188, wherein a guide, e.g., slots 198, may guide anode 200 such that recess 216 seats on longitudinally extending member 218 thereby electrically connecting the electrode to the electrically conductive member when anode 200 has been inserted into chamber 188. Electrically conductive member 214 may subsequently be connected to a power source by any method known in the art for electrically connecting two elements together. For example, electrically conductive member 214 may have a second longitudinally extending portion 222 on which a wire 224 may be provided and secured thereto by a bolt 226 being threadedly received on longitudinally extending portion 222.

As shown in FIG. 18, outer housing 182 preferably has one or more liquid inlet port 222 for providing make up liquid (preferably water) to chamber 188 as liquid is electrolyzed to produce a gas. Liquid inlet port 228 may be in flow communication with a reservoir (not shown). The reservoir may be refillable thereby permitting replacement water to be provided while the electrolizer is still in use. Upper portion 184 may be provided with one or more gas outlet ports 230 which are in fluid flow communication with the head gas collection zone in electrolizer 180. In order to facilitate the entry of make up liquid into chamber 188, the electrode adjacent to the one or more water inlet ports 228 may have a recess 232 provided to permit the incoming liquid to flow into chamber 188.

In accordance of another aspect of the instant invention, a heat exchanger may be provided to assist in maintaining the electrodes and/or the electrolyte solution at a pre-determined temperature or within a pre-determined temperature range. For example, an external heat exchanger may be connected in fluid flow communication with chamber 188 by an outlet passage extending between chamber 188 and the heat exchanger and a return passage extending from the heat exchanger to the chamber 188. A pump may be provided to circulate the fluid in a continuous loop, continuously or intermittently, through the heat exchanger, thereby dissipating heat, or providing heat if required, to chamber 188. The heat exchanger may have an exterior surface over which cooling fluid (e.g. air) may be passed such as by natural or forced conduction to assist in dissipating heat from the heat exchanger. Preferably, the temperature of the electrolyte solution is maintained at a temperature above the freezing point of the electrolyte solution and below the boiling point of the electrolyte solution, preferably at a temperature between 70 and 170° F. and, more preferably between 120 and 160° F. It will be appreciated that, in some applications, the electrolyzer may be utilized outside, e.g., an outdoors barbeque. In such a case, the electrolyzer may be provided in a location where the ambient temperature may be below the freezing temperature of the electrolyte solution. Accordingly, the heat exchanger may be utilized to provide heat to prevent the electrolyte solution from freezing. Other such constructions known in the heat exchange or heating and/or cooling arts may be utilized. For example, if a heat sink is provided on an exterior surface of outer housing 182, then a cooling fluid may be circulated through the heat sink or adjacent an exterior surface of the heat sink.

In accordance with a further alternate aspect of the instant invention, outer housing 182 has first and second opposed end walls 190 and longitudinally extending side walls 192 provided between the opposed end walls 190 (i.e. the electrodes are oriented parallel end walls 190). In this alternate embodiment of the instant invention, the side walls are preferably constructed from an electrically insulating material (preferably plastic) and at least one of the end walls is preferably constructed from metal. More preferably, both end walls are constructed from metal. One or both of the end walls if they are constructed from metal may have heat dissipation members provided thereon. Metal typically has a higher thermal conductivity than an electrically insulating material such as plastic or ceramic. Accordingly, one advantage of using metal for the end walls is that the heat dissipation from the electrodes may be enhanced. In addition, a further advantage is that the metal sidewalls may be electrically conductive and accordingly be used as an electrode and/or to provide a method of electrically connecting the electrodes to a power source.

It will be appreciated that various modifications and changes may be made to the embodiments disclosed herein and all such modifications and changes are within the scope of the following claims. In particular, it will be appreciated that each of the features disclosed herein may be used in any possible combination and sub-combinations.

The invention claimed is:

1. A household appliance comprising:
    (a) an electrolyzer having a plurality of electrodes and defining:
        i) at least one oxygen producing cell and at least one oxygen outlet port in fluid flow communication therewith;
        ii) at least one hydrogen producing cell and at least one hydrogen outlet port in fluid flow communication therewith;
    (b) the electrodes comprise at least one cathode, at least one anode and a plurality of generally U shaped field electrodes positioned between the anode and the cathode, each generally U shaped field electrode comprising first and second opposed surfaces, each opposed surface having an absence of openings therethrough; and,
    (c) a burner in fluid flow communication with at least the hydrogen outlet port.

2. The household appliance of claim 1 wherein the electrolyzer is operable on household current.

3. The household appliance of claim 1 wherein the electrolyzer has from 40 to 60 field electrodes and operates on 120V.

4. The household appliance of claim 1 wherein the electrolyzer has from 80 to 120 field electrodes and operates on 240V.

5. The household appliance of claim 1 wherein the electrolyzer has from 4 to 6 field electrodes and operates on 12V.

6. The household appliance of claim 1 wherein the household appliance is a cooking appliance.

7. The household appliance of claim 1 wherein the household appliance is portable and includes a power cord that is removably receivable in a household electrical outlet.

8. The household appliance of claim 1 wherein the field electrodes comprise first and second electrodes which are electrically connected together and spaced apart to define an intra cell gap between the first and second electrodes of the same field electrode and wherein the field electrodes are spaced apart to define an inter cell gap between electrodes of adjacent field electrodes.

9. The household appliance of claim 8 wherein each of the field electrodes is generally U shaped.

10. The household appliance of claim 9 wherein each of the field electrodes is formed by bending a generally planer member into a generally U shape.

11. The household appliance of claim 8 wherein the first and second electrodes of each field electrode are connected together by a member that in integrally formed with the first and second electrodes.

12. The household appliance of claim 8 wherein the inter cell gap is from 0.005 and 2 inches.

13. The household appliance of claim 8 wherein the inter cell gap is from 0.005 and 0.25 inches.

14. The household appliance of claim 8 wherein the inter cell gap is from 0.005 and 0.1 inches.

15. The household appliance of claim 8 wherein the inter cell gap is from 0.01 and 0.06 inches.

16. The household appliance of claim 8 wherein the intra cell gap is from 0.05 and 2 inches.

17. The household appliance of claim 8 wherein the intra cell gap is from 0.075 and 0.75 inches.

18. The household appliance of claim 8 wherein the intra cell gap is from 0.125 and 0.5 inches.

19. The household appliance of claim 1 further comprising an electric conductive member adapted to be connected to a household electrical power outlet, wherein the electric conductive member provides the electrolyzer with the same voltage that is supplied by the household electrical power outlet.

20. The appliance of claim 19 wherein the electric conductive member comprises a circuit which does not incorporate a transformer.

21. The household appliance of claim 1 wherein the concentration of the electrolyte in the electrolyte solution is 0.25% to 10% by weight based on the total weight of the electrolyte solution.

22. The household appliance of claim 1 wherein the concentration of the electrolyte in the electrolyte solution is 0.75% to 5% by weight based on the total weight of the electrolyte solution.

23. The household appliance of claim 1 wherein the generally U shaped field electrodes are spaced from the bottom of the electrolyzer and a flow channel is positioned beneath the generally U shaped field electrodes.

* * * * *